US012627649B1

(12) United States Patent
Shanbhogue et al.

(10) Patent No.: US 12,627,649 B1
(45) Date of Patent: May 12, 2026

(54) SECURE INFORMATION EXCHANGE

(71) Applicant: Amazon Technologies, Inc., Seattle, WA (US)

(72) Inventors: Akshaya Vishnu Kudlu Shanbhogue, Seattle, WA (US); Venkatesh Krishnamoorthy, Bothell, WA (US); Abraham Martin Passaglia, Seattle, WA (US); Tao Wu, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 607 days.

(21) Appl. No.: 17/403,239

(22) Filed: Aug. 16, 2021

Related U.S. Application Data

(63) Continuation of application No. 16/265,670, filed on Feb. 1, 2019, now Pat. No. 11,102,195.

(51) Int. Cl.
| | |
|---|---|
| *H04L 29/06* | (2006.01) |
| *H04L 9/40* | (2022.01) |
| *H04L 12/28* | (2006.01) |
| *H04L 67/141* | (2022.01) |

(52) U.S. Cl.
CPC ........ *H04L 63/083* (2013.01); *H04L 12/2838* (2013.01); *H04L 67/141* (2013.01)

(58) Field of Classification Search
CPC .. H04L 63/083; H04L 12/2838; H04L 67/141
See application file for complete search history.

(56) References Cited

U.S. PATENT DOCUMENTS

| | | | |
|---|---|---|---|
| 10,044,674 | B2 | 8/2018 | Liu et al. |
| 10,332,513 | B1 | 6/2019 | D'Souza et al. |
| 10,719,122 | B2 * | 7/2020 | Marti .................... H04L 67/535 |
| 10,949,506 | B2 | 3/2021 | Chen |
| 2008/0168539 | A1 | 7/2008 | Stein |
| 2009/0187983 | A1 | 7/2009 | Zerfos et al. |
| 2014/0073288 | A1 | 3/2014 | Velasco |
| 2016/0091871 | A1 * | 3/2016 | Marti .................... H04L 67/535 |
| | | | 702/188 |
| 2017/0359555 | A1 * | 12/2017 | Irani .................... G08B 21/182 |
| 2018/0041586 | A1 * | 2/2018 | Ueda .................... H04L 43/0817 |
| 2018/0176748 | A1 * | 6/2018 | Kim .................... H04L 63/0861 |
| 2018/0190285 | A1 * | 7/2018 | Heckmann .............. G10L 15/22 |
| 2019/0028338 | A1 * | 1/2019 | Kozura .............. H04W 12/069 |
| 2020/0274868 | A1 | 8/2020 | Passaglia et al. |
| 2021/0132559 | A1 * | 5/2021 | Ni ........................ G06F 3/04847 |

FOREIGN PATENT DOCUMENTS

| | | | |
|---|---|---|---|
| WO | WO2017120243 | 7/2017 | |
| WO | WO-2017120243 A1 * | 7/2017 | ............. H04L 63/02 |

* cited by examiner

*Primary Examiner* — Ellen Tran

(74) *Attorney, Agent, or Firm* — Nicholson De Vos Webster & Elliott LLP

(57) ABSTRACT

Systems and methods for secure information exchange are disclosed. During setup of an accessory device in association with a voice-enabled device, token data may be generated and signed using a private encryption key by the accessory device. An accessory-device system associated with the accessory device may send a request for account identification including the token data to a remote system associated with the voice-enabled device. The remote system may determine if an application associated with the accessory-device system is enabled, and if enabled, may send the account identification in an encrypted format to the accessory-device system.

20 Claims, 10 Drawing Sheets

100

| Speech-Processing System 142 | Smart-Home System 144 |
|---|---|
| | Smart-Home Speechlet 158 |
| ASR 154 · NLU 156 | Provisioning Comp. 160 |
| User Registry 146 | Request Storage 162 |
| Setup Comp. 148 | Notification Comp. 164 |
| Application Comp. 150 | Discovery Comp. 166 |
| Application-Enablement Queue 152 | Device-Naming Comp. 168 |

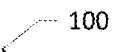

108

New device available

Network 110

132

104

106

"New device available"

102

Processor(s) 122
Interface(s) 124
Memory 126
Private Encryption Key 128
Setup Comp. 130

Processor(s) 134
Interface(s) 136
Memory 138
Application(s) 140

Processor(s) 112
Interface(s) 114
Memory 116
Microphone(s) 118
Speaker(s) 120

FIG. 1

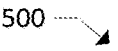

500

Receive, from accessory device, first data representing first request for network access credentials to establish network connection
502

Generate session token for setup session to configure accessory device, session token representing unique identifier of setup session and identifying device identifier of accessory device
504

Associate device identifier with user account
506

Receive, from remote system associated with accessory device, second data representing second request for account information associated with user account, second data including session token
508

In response to receiving second data including session token, determining that skill associated with remote system is enabled for use by user account
510

Generate, in response to determining that skill is enabled, third data including account information
512

Send third data to remote system, third data associating account information with device identifier
514

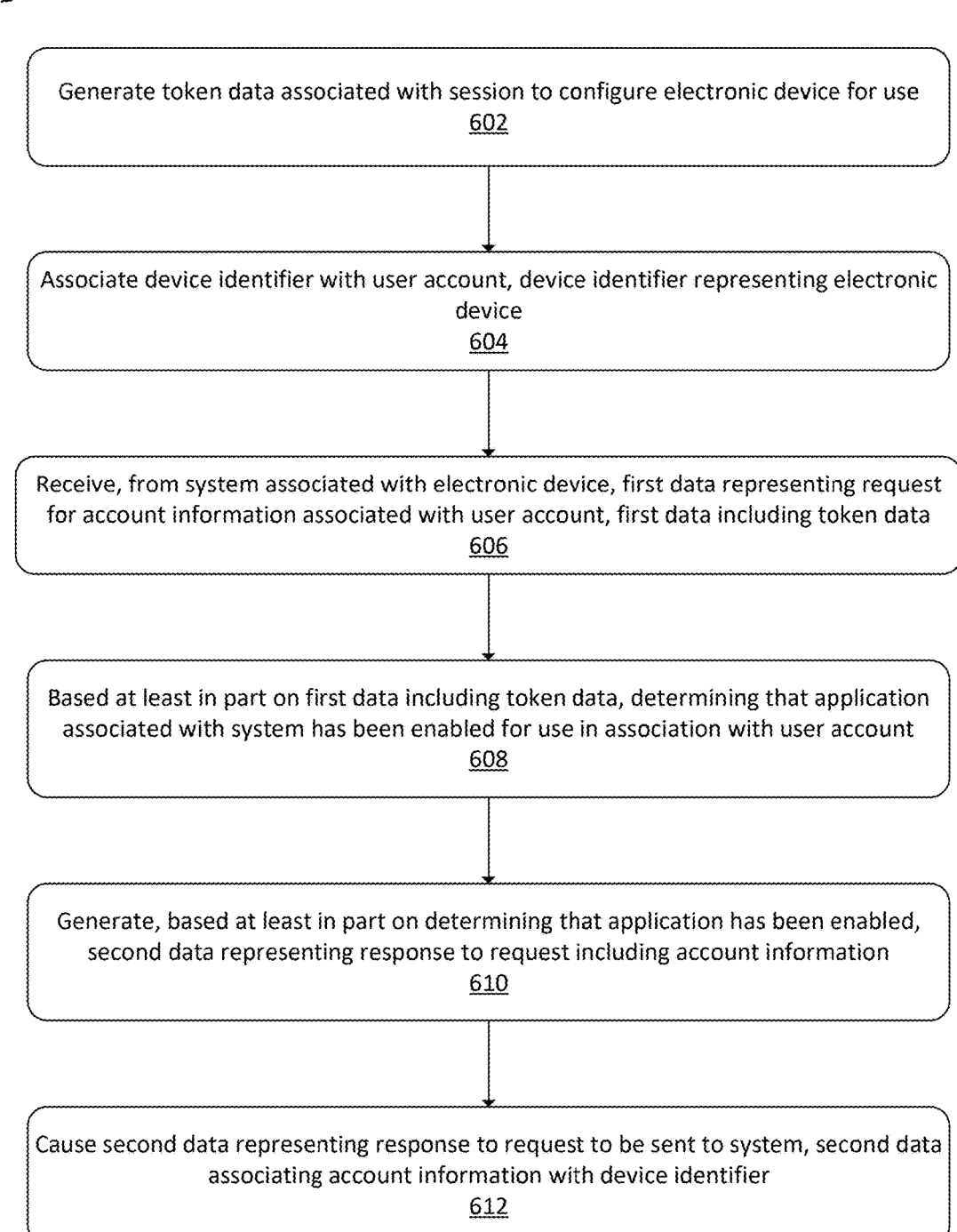

Generate token data associated with session to configure electronic device for use
602

Associate device identifier with user account, device identifier representing electronic device
604

Receive, from system associated with electronic device, first data representing request for account information associated with user account, first data including token data
606

Based at least in part on first data including token data, determining that application associated with system has been enabled for use in association with user account
608

Generate, based at least in part on determining that application has been enabled, second data representing response to request including account information
610

Cause second data representing response to request to be sent to system, second data associating account information with device identifier
612

SECURE INFORMATION EXCHANGE

RELATED APPLICATIONS

This application claims priority to and is a continuation of U.S. patent application Ser. No. 16/265,670, filed on Feb. 1, 2019, the entire contents of which are incorporated herein by reference.

BACKGROUND

Smart-home devices have become ubiquitous. Smart-home device users and/or manufacturers may desire to communicate with systems associated with voice-enabled devices, for example. Described herein are improvements in technology and solutions to technical problems that can be used to, among other things, improve communication between smart-home systems and other systems, such as systems associated with voice-enabled devices.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 1 illustrates a schematic diagram of an example environment for secure information exchange.

FIG. 5 illustrates a flow diagram of an example process for secure information exchange.

FIG. 6 illustrates a flow diagram of another example process for secure information exchange.

DETAILED DESCRIPTION

Figure 2:
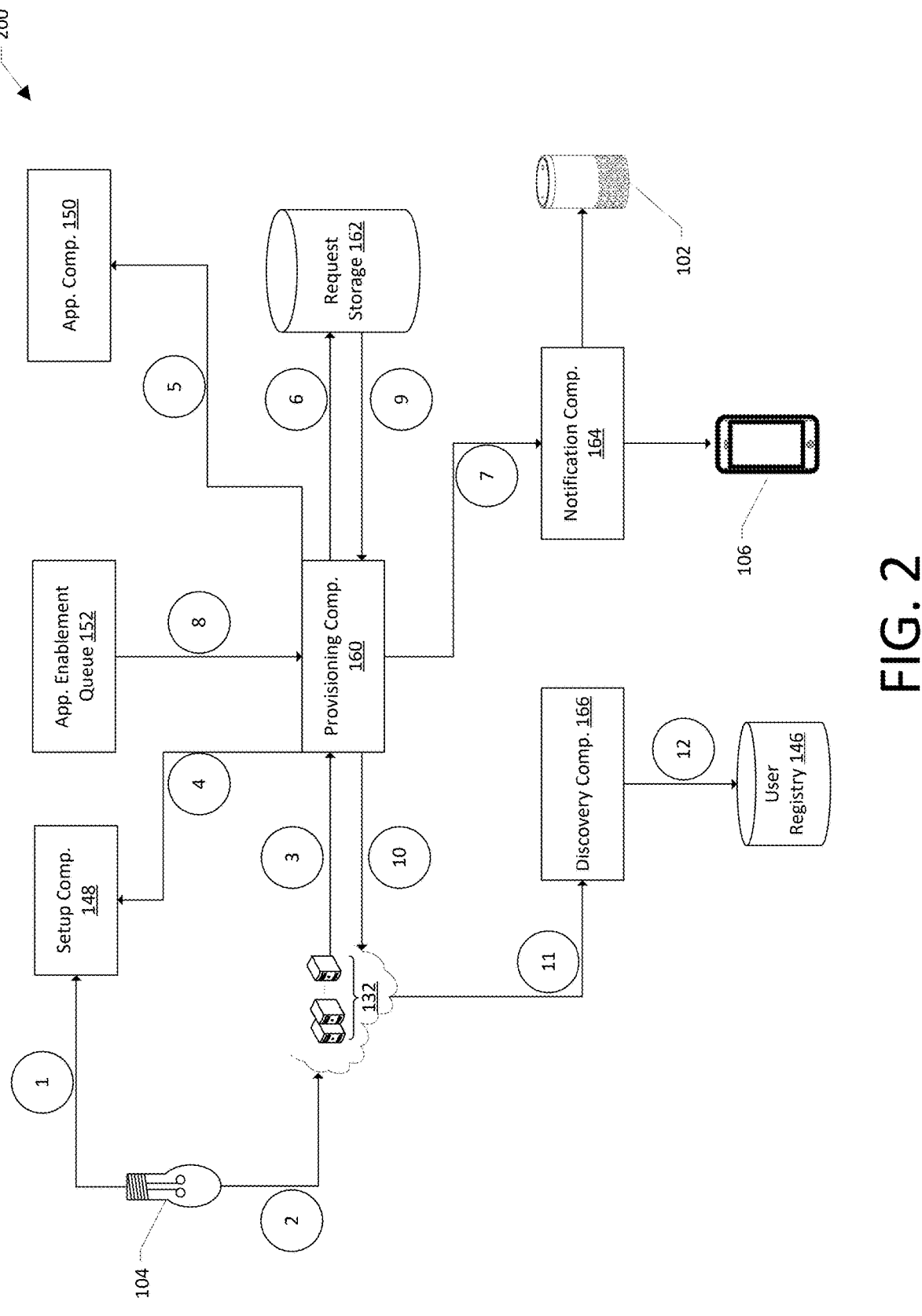
FIG. 2 illustrates a conceptual diagram of example components of systems for secure information exchange.

Systems and methods for secure information exchange are disclosed. Take, for example, an environment or space such as a home that may have one or more voice-enabled devices, such as an Amazon Echo-type device, smart phone, or television/settop box with a voice user interface. The voice-enabled devices may be configured, for example, to receive audio representing user utterances and generate corresponding audio data to be utilized by a remote system, for example, to cause an operation to be performed. The voice-enabled devices may be manufactured by a first entity associated with the remote system. The environment may also include, for example, one or more "smart home" devices, which are otherwise described herein as accessory devices. The accessory devices may include, for example, light bulbs, plugs, light switches, televisions, locks, alarms, cameras, doorbells, thermostats, household appliances, garage-door openers, wearable devices, clocks, etc. It should be understood that the list of example accessory devices as provided herein is not an exclusive list. Instead, this disclosure includes, as accessory devices, any computing device that may send and receive data and/or instructions and may perform operations based at least in part on the received data and/or instructions. The accessory devices, in examples, may be manufactured by a second entity that differs from the first entity and the accessory devices may be associated with a system associated with the accessory device that differs from the remote system associated with the voice-enabled devices.

In examples, after purchase of an accessory device, a user goes through a process of setting up the accessory device so that it is operational. Some setup processes may involve instructing the user to perform a set of steps to setup the accessory device. For example, the user may be instructed to download and/or otherwise gain access to an application provided by the system associated with the accessory device. A user interface associated with the application may present additional instructions for setting up the accessory device. However, in examples where the environment includes a voice-enabled device, the voice-enabled device may be utilized to setup and/or otherwise configure the accessory device for operation. For example, the user may have setup the voice-enabled device at an earlier time, and setup of the voice-enabled device may have included identifying network-access credentials for accessing a wireless network associated with the environment, generating and/or identifying a user account associated with the voice-enabled device, and/or configuring one or more settings associated with the voice-enabled device. Some or all of this user account data may be stored in association with a user registry of the remote system. As another example, the password to access a WiFi access point may change and, after updating one device on the network with the new password, it can securely share the password with the other known devices.

In these examples, when an accessory device is plugged in, otherwise needs credentials to be capable of wirelessly communicating with one or more other devices, the accessory device may send a signal that may be received by the voice-enabled device and/or one or more other devices configured to receive and/or utilize credential information. In other examples, the voice-enabled device may send a signal periodically, on a scheduled basis, and/or randomly that may be received by the accessory device. The accessory device, in these examples, may send a return signal. The voice-enabled device may identify the accessory device and/or data associated with the signal received from the accessory device may be sent to the remote system, which may identify the accessory device and send return data including, for example, network-access credentials associated with establishing wireless communication between the accessory device and the voice-enabled device. The voice-enabled device and/or the accessory device may utilize the network-access credentials to allow the accessory device to communicate with the voice-enabled device and/or one or more other devices over the network.

Additionally, the remote system may generate token data for setting up the accessory device in association with the voice-enabled device and/or the remote system. The token data may indicate the device identifier of the accessory device as provided by the accessory device and the voice-enabled device associated with network on which the accessory device is communicating. The network-access credentials, the token data, and, in examples, a device identifier provided by the remote system for the accessory device may be sent from the remote system to the accessory device, such as via the network. The voice-enabled device and/or the accessory device may utilize the network-access credentials to allow the accessory device to connect to the network and communicate with the voice-enabled device and/or one or more other devices over the network.

Thereafter, the accessory device may send a communication to the system associated with the accessory device. The communication may include, for example, a public encryption key associated with the system associated with the accessory device and/or the accessory device, the token data as signed utilizing a private encryption key stored in association with the accessory device, and/or the device identifier of the accessory device as provided by the remote system. In examples, the accessory device may utilize the private key, which may be known only to the accessory device, to generate a digital signature, which may be appended or otherwise associated with the token data. The system associated with the accessory device, having received the communication from the accessory device, may send request data indicating a request to the remote system for user account information associated with the user account. The request data may include, for example, the signed token data, the device identifier, and/or an indication of an application, which may be otherwise described herein as a "skill," associated with the system associated with the accessory device and/or the accessory device.

The remote system may receive the request data and may identify the user account associated with the request based at least in part on the token data. For example, the remote system may have access to the public encryption key for the system associated with the accessory device. The system associated with the accessory device may have provided the public encryption key prior to the processes described herein, for example. The remote system may determine that the token data has been signed and may, utilizing the public encryption key, decrypt the token data to identify the device identifier of the device at issue. The remote system may utilize the token data to identify the user account at issue. The remote system may then determine if the application for the system associated with the accessory device indicated in the request data has been enabled in association with the user account. For example, the system associated with the accessory device and/or an entity associated therewith may have developed the application for use in association with the voice-enabled device. In an example where the accessory device is a light bulb, the system associated with the accessory device may have developed an application available to the remote system to allow a user to provide user utterances such as "turn on the light bulb," and the remote system may utilize audio data representing that user utterance along with the functionality of the application to cause the accessory device to perform an action, such as causing the light bulb to emit light.

In examples where the application has not been enabled, response data may be sent to the system associated with the accessory device indicating that the application has not been enabled. The request data and/or portions thereof may be stored in association with the remote system and, in examples, the device identifier for the accessory device may not appear in and/or be retrieved from the user registry. In examples, notification data may be generated based at least in part on determining that the application has not been enabled. The notification data may include an alert that the application is not enabled and/or a request to enable the application. The notification data may be sent to a personal device, such as a mobile phone, associated with the voice-enabled device, and/or to the voice-enabled device. In examples where the notification data is sent to the personal device, the notification data may provide one or more instructions to assist in enabling the application and/or the notification data may include a link or other selectable portion that, when selected, may cause a user interface to be displayed on a screen of the personal device. The user interface may include an option and/or instructions for enabling the application. In examples where the notification data is sent to the voice-enabled device, the notification data may include audio data. Audio corresponding to the audio data may be output via a speaker of the voice-enabled device and the audio may include an instruction to assist in enabling the application. In examples, the audio may include a request that the user provide a responsive user utterance instructing the remote system to enable the application. For example, the audio may include "an application for one of your devices is not enabled, would you like to enable it?" The user may provide a user utterance, such as "yes," and corresponding audio data may be processed by the remote system and utilized to enable the application.

Once the application is enabled, and/or if the application was enabled at the time of the request for user account information from the system associated with the accessory device, the remote system may generate response data to be sent to the system associated with the accessory device. The response data may be encrypted using one or more public and/or private encryption keys. The response data may include the device identifier(s) for the accessory device, the user account information, and/or other information permitted to be shared by the user. It should be understood that any or all of the user account information may only be sent from the remote system to the system associated with the accessory device when a user associated with the user account has provided permission for such information to be sent. Permission may be acquired during the application enablement process and/or at the time of the request from the system associated with the accessory device. The response data may also, in examples, include a naming indicator associated with the accessory device. For example, the remote system and/or the user may have identified and/or assigned a naming indicator such as "Rob's light" to the accessory device. That naming indicator may be sent with the response data from the remote system to the system associated with the accessory device.

Additionally, or alternatively, the system associated with the accessory device, having received the user account information, may send an instruction and/or request data for device discovery, such as proactive device discovery. For example, while the accessory device may be setup in association with the system associated with the accessory device, setup of the accessory device with the remote system associated with the voice-enabled device may not have been performed. In examples, a user may utilize a personal device and/or the voice-enabled device to setup or otherwise "discover" the accessory device in association with the remote system. In other examples, the remote system may be configured to perform the setup and/or "discovery" without interaction with the user. For example, having received the device-discovery request from the system associated with the accessory device, the remote system may identify and/or determine the device identifier for the device, the naming indicator, if any, the user account in question, and/or the device identifier for the voice-enabled device associated with the user account. Using some or all of this information, the remote system may associate the device identifier and/or the naming indicator for the accessory device with the user account such that the user may utilize the voice-enabled device and/or the remote system to perform operations associated with the accessory device.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for secure information exchange. The system 100 may include, for example, a voice-enabled device 102. The voice-enabled device 102 may be configured to receive user utterances and perform operations in response to such user utterances. In these examples, the voice-enabled device 102 may be "hands free" such that interactions with the device are performed through audible requests and responses.

The system 100 may also include one or more accessory devices 104. The accessory devices 104 may be described as "smart" devices, which may have certain computing components and be configured to send and/or receive data from other devices. The accessory devices 104 may be, for example, light bulbs, plugs, locks, televisions, appliances, doorbells, cameras, etc. As shown in FIG. 1, the space in which the voice-enabled device 102 is situated may include an accessory device 104, which may be a light bulb. The accessory device 104 may be "paired" or otherwise associated with the voice-enabled device 102. As such, the accessory device 104 may be configured to send data to and/or receive data from the voice-enabled device 102. The system 100 may also include a personal device 106, which may include a mobile phone, tablet, laptop, and/or other computing device. The voice-enabled device 102, the accessory devices 104, and/or the personal device 106 may be configured to send data to and/or receive data from the remote system 108, such as via a network 110. In examples, voice-enabled device 102 and/or the accessory devices 104 may communicate directly with the system 108, via the network 110.

The voice-enabled device 102 may include one or more components, such as, for example, one or more processors 112, one or more network interfaces 114, memory 116, one or more microphones 118, and/or one or more speakers 120. The microphones 118 may be configured to capture audio, such as user utterances, and generate corresponding audio data. The speakers 120 may be configured to output audio, such as audio corresponding to audio data received from another device and/or the system 108. It should be understood that while several examples used herein include a voice-enabled device 102 that allows users to interact therewith via user utterances, one or more other devices, which may not include a voice interface, may be utilized instead of or in addition to voice-enabled devices 102. In these examples, the device may be configured to send and receive data over a network and to communicate with the accessory device 104. As such, in each instance where a voice-enabled device is utilized, a computing device that does not include a voice interface may also or alternatively be used.

The accessory devices 104 may include one or more components, such as, for example, one or more processors 122, one or more network interfaces 124, memory 126, and/or a setup component 130. The memory 126 and/or processors 122 may be utilized to cause certain operations to be performed by the accessory devices 104, such as activating and/or deactivating the device functionality of the accessory device 104. The device functionality may include components associated with the intended use of the accessory devices 104. For example, one of the accessory devices 104 may be a light bulb, and in this example, the device functionality components may include a filament and/or light emitting diode that may produce and/or emit light. By way of further example, another accessory device 104 may be a wall plug, and in this example, the device functionality components may include an "on/off mechanism" for causing electricity to flow or not flow to a device that is plugged in to the wall plug. It should be noted that the device functionalities illustrated here are by way of example only.

The memory 126 of the accessory device 104 may include a private encryption key 128. For example, a private encryption key 128 known to the accessory device 104 and, in examples, a accessory-device system 132, may be stored in association with the memory 126 and may be utilized by the accessory device 104 to generate a digital signature associated with token data, as described elsewhere herein. The private encryption key 128 may be a cryptographic key which may represent a string of numbers and/or letters. The private encryption key 128 may be utilized to decrypt information encrypted with a corresponding public encryption key, or vice versa. The key encryption described herein may be utilized to authenticate and encrypt/decrypt data transferred between the remote system 108 and the accessory-device system 132.

The personal device 106 may include one or more components, such as, for example, one or more processors 134, one or more network interfaces 136, and/or memory 138. The memory 138 may include one or more components such as, for example, one or more applications 140 residing on the memory 138 and/or accessible to the mobile device 106. The applications(s) 140 may be configured to cause the processor (s) 134 to receive information associated with interactions with the voice-enabled device 102 and cause display of representations, such as text and/or images, associated with the interactions. The application(s) 140 may also be utilized, in examples, to receive input data, such as from a user of the personal device 106, and send the input data and/or instructions associated with the input data to the remote system 108. The application(s) 140 may also be utilized to display notifications and/or alerts received, for example, from the remote system 108.

The remote system 108 may include components such as, for example, a user a speech-processing system 142, a smart-home system 144, a user registry 146, a setup component 148, an application component 150, and/or an application-enablement queue 152. The speech-processing system 142 may include an automatic speech recognition (ASR) component 154 and/or a natural language understanding (NLU) component 156. The smart-home system 144 may include a smart-home speechlet 158, a provisioning component 160, request storage 162, a notification component 164, a discovery component 166, and/or a device-naming component 168. Each of the components described herein with respect to the remote system 108 may be associated with their own systems, which collectively may be referred to herein as the remote system 108, and/or some or all of the components may be associated with a single system. The components of the remote system 108 are described in detail below: In examples, some or each of the components of the remote system 108 may include their own processor(s), network interface(s), and/or memory. As such, by way of example, the speech-processing system 142 may include and/or be associated with processor(s), network interface(s), and/or memory. The smart-home system 144 may include and/or be associated with different processor(s), network interface(s), and/or memory, or one or more of these components may utilize some or all of the same processor (s), network interface(s), and/or memory utilized by the speech-processing system 142. These components are described in detail below. Additionally, the operations and/or functionalities associated with and/or described with respect to the components of the remote system 108 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

The user registry component 146 may be configured to identify, determine, and/or generate associations between users, user accounts, and/or devices. For example, one or more associations between user accounts may be identified, determined, and/or generated by the user registry 146. The user registry 146 may additionally store information indicating one or more applications and/or resources accessible to and/or enabled for a given user account. Additionally, the user registry 146 may include information indicating device identifiers, such as naming identifiers, associated with a given user account, as well as device types associated with the device identifiers. The user registry 146 may also include information indicating user account identifiers, naming indicators of devices associated with user accounts, and/or associations between devices, such as the voice-enabled device 102 and the accessory devices 104. The user registry 146 may also include information associated with usage of the voice-enabled devices 102 and/or the accessory devices 104. It should also be understood that a user account may be associated with one or more than one user profiles. It should also be understood that the term "user account" may be used to describe a set of data and/or functionalities associated with a given account identifier. For example, data identified, determined, and/or generated while using some or all of the system 100 may be stored or otherwise associated with an account identifier. Data associated with the user accounts may include, for example, account access information, historical usage data, device-association data, and/or preference data.

The speech-processing system 142 may be configured to receive audio data from the voice-enabled device 102 and perform speech-processing operations. For example, the ASR component 154 may be configured to generate text data corresponding to the audio data, and the NLU component 156 may be configured to generate intent data corresponding to the audio data. In examples, intent data may be generated that represents the audio data, such as without the generation and/or use of text data. The intent data may indicate a determined intent associated with the user utterance as well as a payload and/or value associated with the intent. For example, for a user utterance of "turn on Rob's light," the NLU component 156 may identify a "turn on" intent and the payload may be "Rob's light." In this example where the intent data indicates an intent to activate an accessory device 104 with a device identifier of "Rob's light," the speech-processing system 142 may call one or more speechlets to effectuate the intent. Speechlets, as described herein may otherwise be described as applications and may include functionality for utilizing intent data to generate directives and/or instructions. For example, the smart-home speechlet 158 associated with the smart-home system 144 may be called when the intent indicates that an action is to be performed in association with an accessory device 104. The speechlet 158 may be designated as being configured to handle the intent of turning on and/or turning off an accessory device 104, for example. The speechlet 158 may receive the intent data and/or other data associated with the user utterance from the NLU component 156, such as by an orchestrator of the remote system 108, and may perform operations to instruct the voice-enabled device 102 and/or the accessory device 104 to perform an operation.

The application(s), otherwise described herein as speechlet(s), herein may include a speech-enabled web component that may run in the remote system 108. Application(s) may receive and respond to speech-initiated requests. Applications(s) may define life-cycle events for an application as experienced by a user, a way to process speech requests from the user, and/or call-backs from events happening on the device the user is interacting with. Given applications(s) may be capable of handling certain intents. For example, the NLU component 156 may generate intent data that indicates an intent as well as a payload associated with the intent. An application may be associated with the intent, and thus the intent data, including the payload may be sent to and received by the application. The application may process that intent by analyzing the payload and generating data representing a directive and/or instruction to perform an action. The directive and/or instruction may be sent to other components of the system for performance of the action.

It should be understood that "applications" as described herein may include functionality for performing operations associated with accessory devices. "Skills," as described herein may be applications and/or may be a subset of an application. For example, a skill may receive as input data representing an intent. For example, an intent may be determined by a natural language understanding component and/or as determined from user input via a computing device. Skills may be configured to utilized the intent to output data for a text-to-speech system's input, a link or other resource locator for audio data, and/or a command to a device, such as an accessory device. In instances where a voice-enabled device is utilized, skills may extend the functionality of an accessory device that can be controlled user a voice-user interface. In some examples, skills may be a type of application that may be useable in association with accessory devices and may have been developed specifically to work in connection with given accessory devices. Speech-lets, as described herein, may be a type of application that may be usable in association with voice-enabled devices and may have been developed specifically to work in connection with voice-enabled devices.

It should be noted that while text data is described as a type of data utilized to communicate between various components of the remote system 108 and/or other systems and/or devices, the components of the remote system 108 may use any suitable format of data to communicate. For example, the data may be in a human-readable format, such as text data formatted as XML, SSML, and/or other markup language, or in a computer-readable format, such as binary, hexadecimal, etc., which may be converted to text data for display by one or more devices such as the voice-enabled device 102.

The setup component 148 may be configured to assist in the process of setting up and/or configuring an accessory device 104. For example, where the system 100 includes a voice-enabled device 102, the voice-enabled device 102 may be utilized to setup and/or otherwise configure the accessory device 104 for operation. For example, the user may have setup the voice-enabled device 102 at an earlier time, and setup of the voice-enabled device 102 may have included identifying network access credentials for accessing a wireless network associated with the environment in which the voice-enabled device 102 is situated, generating and/or identifying a user account associated with the voice-enabled device 102, and/or configuring one or more settings associated with the voice-enabled device 102. Some or all of this user account data may be stored in association with the user registry 146 of the remote system 108.

In these examples, when the accessory device 104 is plugged in or otherwise acquires power such that the network interface 124 of the accessory device 104 is capable of wirelessly communicating with one or more other devices, the accessory device 104 may send a signal that may be received by the voice-enabled device 102. In other examples, the voice-enabled device 102 may send a signal periodically, on a scheduled basis, and/or randomly that may be received by the accessory device 104. The accessory device 104, in these examples, may send a return signal. The voice-enabled device 102 may identify the accessory device 104 and/or data associated with the signal received from the accessory device 104 may be sent to the remote system 108, which may identify the accessory device 104 and send return data including, for example, network access credentials associated with establishing wireless communication between the accessory device 104 and the voice-enabled device 102. The voice-enabled device 102 and/or the accessory device 104 may utilize the network access credentials to allow the accessory device 104 to communicate with the voice-enabled device 102 and/or one or more other devices over the network 110.

Additionally, the setup component 148 may generate token data for setting up the accessory device 104 in association with the voice-enabled device 102 and/or the remote system 108. The token data may indicate the device identifier of the accessory device 104 as provided by the accessory device 104 and the voice-enabled device 102 associated with network 110 on which the accessory device 108 is communicating. The network access credentials, the token data, and, in examples, a device identifier provided by the remote system 108 for the accessory device 104 may be sent from the remote system 108 to the accessory device 104, such as via the network 110. The voice-enabled device 102 and/or the accessory device 104 may utilize the network access credentials to allow the accessory device 104 to connect to the network 110 and communicate with the voice-enabled device 102 and/or one or more other devices over the network 110.

The accessory device 104 may then send a communication to the accessory-device system 132 associated with the accessory device 104. The communication may include, for example, a public encryption key associated with the accessory-device system 132 and/or the accessory device 104, the token data as signed utilizing the private encryption key 128, and/or the device identifier of the accessory device 104 as provided by the remote system 108. In examples, the accessory device 104 may utilize the private encryption key 128, which may be known only to the accessory device 104 and/or the accessory-device system 132, to generate a digital signature, which may be appended or otherwise associated with the token data. The accessory-device system 132, having received the communication from the accessory device 104, may send request data indicating a request to the remote system 108 for user account information associated with the user account. The request data may include, for example, the signed token data, the device identifier, and/or an indication of an application, which may be otherwise described herein as a "skill," associated with the accessory-device system 132 and/or the accessory device 104.

The provisioning component 160 of the remote system 108 may receive the request data and may identify the user account associated with the request based at least in part on the token data. For example, the provisioning component 160 may have access to the public encryption key for the accessory-device system 132. The accessory-device system 132 may have provided the public encryption key prior to the processes described herein, for example, and/or the public encryption key may be provided as part of the request data. The provisioning component 160 may determine that the token data has been signed and may, utilizing the public encryption key, decrypt the token data to identify the device identifier of the accessory device 104. The provisioning component 160 may utilize the token data to identify the user account at issue. For example, the provisioning component 160 may query the setup component 148 based at least in part on the token data received from the accessory-device system 132. The token data may be analyzed in association with token data generated by the setup component 148 to identify corresponding token data stored in association with the setup component 148. In examples, a time value associated with generation of the token data by the setup component 148 may be identified, determine, and/or generated and may be analyzed in association with a time value at which the request data was received from the accessory-device system 132. In examples, if the two time values are within a threshold time period, the process of securely exchanging information as described herein may continue. If the two time values are not within a threshold time period, the remote system 108 may determine that the process should not continue may be not send user account data to the accessory-device system 132, as otherwise described herein.

The provisioning component 160 may then determine if the application for the accessory-device system 132 indicated in the request data has been enabled in association with the user account. For example, the accessory-device system 132 and/or an entity associated therewith may have developed the application for use in association with the voice-enabled device 102. In an example where the accessory device 104 is a light bulb, the accessory-device system 132 may have developed an application available to the remote system 108 to allow a user to provide user utterances such as "turn on the light bulb," and the remote system 108 may utilize audio data representing that user utterance along with the functionality of the application to cause the accessory device 104 to perform an action, such as causing the light bulb to emit light. To determine if the application has been enabled, the provisioning component 160 may call the application component 150, which may store data indicating which applications have been enabled in association with a given user account. The application component 150 may store this data, and/or the application component 150 may query the user registry 146 and/or one or more other databases to determine whether a given application is enabled in association with a given user account. The application component 150 may return results to the provisioning component 160 indicating whether the application is enabled.

In examples where the application has not been enabled, the provisioning component 160 may identify, determine, and/or generate response data to be sent to the accessory-device system 132 indicating that the application has not been enabled. The request data and/or portions thereof may be stored in association with the application-enablement queue 152 and, in examples, the device identifier for the accessory device 104 may not appear in and/or be retrieved from the user registry 146. The application-enablement queue 152 may be utilized to determine when a accessory-device system 132 has requested user account data but, at the time of the request, the application associated with the accessory-device system was not enabled. In this way, the accessory-device system 132 does not need to send multiple, such as periodic, request for the user account information.

In examples where the application is not enabled at the time of receipt of the request data, the notification component 164 may be configured to generate notification data based at least in part on determining that the application has not been enabled. The notification data may include an alert that the application is not enabled and/or a request to enable the application. The notification data may be sent to the personal device 106 and/or to the voice-enabled device 102, for example. In examples where the notification data is sent to the personal device 106, the notification data may provide one or more instructions to assist in enabling the application and/or the notification data may include a link or other selectable portion that, when selected, may cause a user interface to be displayed on a screen of the personal device 106. The user interface may include an option and/or instructions for enabling the application. In examples where the notification data is sent to the voice-enabled device 102, the notification data may include audio data. Audio corresponding to the audio data may be output via a speaker 120 of the voice-enabled device 102 and the audio may include an instruction to assist in enabling the application. In examples, the audio may include a request that the user provide a responsive user utterance instructing enablement of the application. For example, the audio may include "an application for one of your devices is not enabled, would you like to enable it?" The user may provide a user utterance, such as "yes," and corresponding audio data may be processed by the speech-processing system 142 and utilized to enable the application.

Once the application is enabled, and/or if the application was enabled at the time of the request for user account information from the accessory-device system 132, the provisioning component 160 may generate response data to be sent to the accessory-device system 132. It should be understood that while the provisioning component 160 is described here and elsewhere as generating the response data, one or more other components of the remote system may generate the response data and/or another device such as the voice-enabled device 102 and/or the personal device 106 may generate the response data. The response data may be encrypted using one or more public and/or private encryption keys. The response data may include the device identifier(s) for the accessory device 104, the user account information, and/or other information permitted to be shared by the user. It should be understood that any or all of the user account information may only be sent from the remote system 108 to the accessory-device system 132 when a user associated with the user account has provided permission for such information to be sent. Permission may be acquired during the application enablement process and/or at or near the time of the request from the accessory-device system 132. The response data may also, in examples, include a naming indicator associated with the accessory device 104. For example, the remote system 108 and/or the user may have identified and/or assigned a naming indicator such as "Rob's light" to the accessory device 104. That naming indicator may be sent with the response data from the remote system 108 to the accessory-device system 132.

Additionally, or alternatively, the accessory-device system 132, having received the user account information, may send an instruction and/or request data for device discovery, such as proactive device discovery. For example, while the accessory device 104 may be setup in association with the accessory-device system 132, setup of the accessory device 104 with the remote system 108 may not have been performed. In examples, a user may utilize the personal device 106 and/or the voice-enabled device 102 to setup or otherwise "discover" the accessory device 104. In other examples, the remote system 108 may be configured to perform the setup and/or "discovery" without interaction with the user. For example, having received the device-discovery request from the accessory-device system 132, the discovery component 166 may identify and/or determine the device identifier for the accessory device 104, the naming indicator, if any, the user account in question, and/or the device identifier for the voice-enabled device 102 associated with the user account. Using some or all of this information, the discovery component 166 may associate the device identifier and/or the naming indicator for the accessory device 104 with the user account such that the user may utilize the voice-enabled device 102 and/or the remote system 108 to perform operations associated with the accessory device 104. In examples, once a given accessory device 104 is "discovered," the notification component 164 and/or one or more other components of the system 108 may send notification data to the personal device 106 and/or the voice-enabled device 102. The notification data may include a notification, whether in the format of text data and/or audio data, indicating that the accessory device 104 has been discovered and is available for use.

The device-naming component 168 may be configured to generate naming indicators for the accessory devices 104. For example, data associated with the accessory device 104, such as a brand name of the accessory device 104, a device type, the voice-enabled device 102 that receives a signal from the accessory device 104, and/or other data associated with the accessory device 104 may be utilized to generate a naming indicator for the accessory device 104. For example, if the data associated with the accessory device 104 indicates that the accessory device is a Brand X lightbulb and the voice-enabled device 102 in communication with the accessory device 104 is named "kitchen device," the device-naming component 168 may utilize this data to generate a naming indicator of "Brand X kitchen light." This information may be included, in examples, in the response data sent to the accessory-device system 132 and/or in the proactive discovery request received at the remote system 108.

As shown in FIG. 1, several of the components of the remote system 108 and the associated functionality of those components as described herein may be performed by one or more of the voice-enabled devices 102, the accessory devices 104, and/or the personal device 106. Additionally, or alternatively, some or all of the components and/or functionalities associated with the voice-enabled devices 102, the accessory devices 104, and/or the personal device 106 may be performed by the remote system 108.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or with the remote system and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 112, 122, 134, and/or the processor(s) described with respect to the components of the remote system 108, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 112, 122, 134, and/or the processor(s) described with respect to the components of the remote system 108 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 112, 122, 134, and/or the processor(s) described with respect to the components of the remote system 108 may possess its own local memory, which also may store program components, program data, and/or one or more operating systems.

The memory 116, 126, 138, and/or the memory described with respect to the components of the remote system 108 may include volatile and nonvolatile memory, removable and non-removable media implemented in any method or technology for storage of information, such as computer-readable instructions, data structures, program component, or other data. Such memory 116, 126, 138, and/or the memory described with respect to the components of the remote system 108 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 116, 126, 138, and/or the memory described with respect to the components of the remote system 108 may be implemented as computer-readable storage media ("CRSM"), which may be any available physical media accessible by the processor(s) 112, 122, 134, and/or the processor(s) described with respect to the remote system 108 to execute instructions stored on the memory 116, 126, 138, and/or the memory described with respect to the components of the remote system 108. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 116, 126, 138, and/or the memory described with respect to the components of the remote system 108, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the Free-BSD operating system as promulgated by the FreeBSD Project: other UNIX or UNIX-like variants: a variation of the Linux operating system as promulgated by Linus Torvalds: the FireOS operating system from Amazon.com Inc. of Seattle, Washington, USA: the Windows operating system from Microsoft Corporation of Redmond, Washington, USA: LynxOS as promulgated by Lynx Software Technologies, Inc. of San Jose, California: Operating System Embedded (Enea OSE) as promulgated by ENEA AB of Sweden; and so forth.

The network interface(s) 114, 124, 136, and/or the network interface(s) described with respect to the components of the remote system 108 may enable messages between the components and/or devices shown in system 100 and/or with one or more other remote systems, as well as other networked devices. Such network interface(s) 114, 124, 136, and/or the network interface(s) described with respect to the components of the remote system 108 may include one or more network interface controllers (NICs) or other types of transceiver devices to send and receive messages over the network 110.

For instance, each of the network interface(s) 114, 124, 136, and/or the network interface(s) described with respect to the components of the remote system 108 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 114, 124, 136, and/or the network interface(s) described with respect to the components of the remote system 108 may include a wide area network (WAN) component to enable message over a wide area network.

In some instances, the remote system 108 may be local to an environment associated the voice-enabled devices 102 and/or the personal device 106. For instance, the remote system 108 may be located within one or more of the voice-enabled devices 102, and/or the personal device 106. In some instances, some or all of the functionality of the remote system 108 may be performed by one or more of the voice-enabled devices 102 and/or the personal device 106. Also, while various components of the remote system 108 have been labeled and named in this disclosure and each component has been described as being configured to cause the processor(s) to perform certain operations, it should be understood that the described operations may be performed by some or all of the components and/or other components not specifically illustrated.

FIG. 2 illustrates a conceptual diagram of example components of a system 200 for secure information exchange. The components are shown and described using steps 1-12, as illustrated in FIG. 2. It should be understood that while steps 1-12 are described in sequential order, some or all of the operations may be performed in an order other than that described herein and/or some or all of the operations may be performed in parallel.

At step 1, when the accessory device 104 is plugged in or otherwise acquires power such that a network interface of the accessory device 104 is capable of wirelessly communicating with one or more other devices, the accessory device 104 may send a signal that may be received by a voice-enabled device. In other examples, the voice-enabled device may send a signal periodically, on a scheduled basis, and/or randomly that may be received by the accessory device 104. The accessory device 104, in these examples, may send a return signal. The voice-enabled device may identify the accessory device 104 and/or data associated with the signal received from the accessory device 104. Additionally, or alternatively, the accessory device 104 may communicate directly with a remote system, which may identify the accessory device 104 and send return data including, for example, network access credentials associated with establishing wireless communication between the accessory device 104 and the voice-enabled device and/or between the accessory device 104 and one or more network access points, such as wireless Internet routers and/or modems, for example. The voice-enabled device and/or the accessory device 104 may utilize the network access credentials to allow the accessory device 104 to communicate with the voice-enabled device and/or one or more other devices over a network.

Additionally, the setup component 148 may generate token data for setting up the accessory device 104 in association with the voice-enabled device and/or the remote system. The token data may indicate the device identifier of the accessory device 104 as provided by the accessory device 104 and/or the voice-enabled device associated with network on which the accessory device 104 is communicating. The network access credentials, the token data, and, in examples, a device identifier provided by the remote system for the accessory device 104 may be sent from the setup component 148 to the accessory device 104, such as via the network. The voice-enabled device and/or the accessory device 104 may utilize the network access credentials to allow the accessory device 104 to connect to the network and communicate with the voice-enabled device 102 and/or one or more other devices over the network.

At step 2, the accessory device 104 may then send a communication to the accessory-device system 132 associated with the accessory device 104. The communication may include, for example, a public encryption key associated with the accessory-device system 132 and/or the accessory device 104. The token data may be signed by the accessory device 104 using a private encryption key 128. For example, a private encryption key known to the accessory device 104 and, in examples, a accessory-device system 132, may be stored in association with memory of the accessory device 104 and may be utilized by the accessory device 104 to generate a digital signature associated with token data, as described elsewhere herein. The private encryption key may be a cryptographic key which may represent a string of numbers and/or letters. The private encryption key may be utilized to decrypt information encrypted with a corresponding public encryption key, or vice versa. The key encryption described herein may be utilized to authenticate and encrypt/decrypt data transferred between the remote system and the accessory-device system 132. In examples, the accessory device 104 may utilize the private encryption key 128, which may be known only to the accessory device 104 and/or the accessory-device system 132, to generate the digital signature, which may be appended or otherwise associated with the token data. In other examples, the accessory device 104 may sign data other than and/or in addition to the token data. For example, the accessory device 104 may utilize the private encryption key to generate a digital signature to be associated with data other than the token data. In these examples, the token data as well as the digital signature associated with the other data may be sent from the accessory device 104 to the accessory-device system 132.

At step 3, the accessory-device system 132, having received the communication from the accessory device 104, may send request data indicating a request to the provisioning component 160 for user account information associated with the user account. The request data may include, for example, the signed token data (and/or the token data and a digital signature associated with other data), the device identifier, and/or an indication of an application, which may be otherwise described herein as a "skill," associated with the accessory-device system 132 and/or the accessory device 104.

The provisioning component 160 of the remote system 108 may receive the request data and may, at step 4, identify the user account associated with the request based at least in part on the token data. For example, the provisioning component 160 may have access to the public encryption key for the accessory-device system 132. The accessory-device system 132 may have provided the public encryption key prior to the processes described herein, for example, and/or the public encryption key may be provided as part of the request data. The provisioning component 160 may determine that the token data has been signed, and/or that the token data has been received along with a digital signature, and may, utilizing the public encryption key, decrypt the token data to identify the device identifier of the accessory device 104. The provisioning component 160 may utilize the token data to identify the user account at issue. For example, the provisioning component 160 may query the setup component 148 based at least in part on the token data received from the accessory-device system 132. The token data may be analyzed in association with the token data generated by the setup component 148 to identify corresponding token data stored in association with the setup component 148. In examples, a time value associated with generation of the token data by the setup component 148 may be identified, determine, and/or generated and may be analyzed in association with a time value at which the request data was received from the accessory-device system 132. In examples, if the two time values are within a threshold time period, the process of securely exchanging information as described herein may continue. If the two time values are not within a threshold time period, the provisioning component 160 may determine that the process should not continue may be not send user account data to the accessory-device system 132, as otherwise described herein.

The provisioning component 160 may then determine, at step 5, if the application for the accessory-device system 132 indicated in the request data has been enabled in association with the user account. For example, the accessory-device system 132 and/or an entity associated therewith may have developed the application for use in association with the voice-enabled device. In an example where the accessory device 104 is a light bulb, the accessory-device system 132 may have developed an application available to the remote system to allow a user to provide user utterances such as "turn on the light bulb," and the remote system may utilize audio data representing that user utterance along with the functionality of the application to cause the accessory device 104 to perform an action, such as causing the light bulb to emit light. To determine if the application has been enabled, the provisioning component 160 may call the application component 150, which may store data indicating which applications have been enabled in association with a given user account. The application component 150 may store this data, and/or the application component 150 may query the user registry 146 and/or one or more other databases to determine whether a given application is enabled in association with a given user account. The application component 150 may return results to the provisioning component 160 indicating whether the application is enabled.

In examples where the application has not been enabled, at step 6, the provisioning component 160 may identify, determine, and/or generate response data to be sent to the accessory-device system 132 indicating that the application has not been enabled. The request data and/or portions thereof may be stored in association with the request storage 162 and, in examples, the device identifier for the accessory device 104 may not appear in and/or be retrieved from the user registry 146. The request storage 162 may be utilized to determine when an accessory-device system 132 has requested user account data but, at the time of the request, the application associated with the accessory-device system 132 was not enabled. In this way, the accessory-device system 132 does not need to send multiple, such as periodic, request for the user account information.

In examples where the application is not enabled at the time of receipt of the request data, at step 7, a notification component 164 may be configured to generate notification data based at least in part on determining that the application has not been enabled. The notification data may include an alert that the application is not enabled and/or a request to enable the application. The notification data may be sent to the personal device 106 and/or to the voice-enabled device 102, for example. In examples where the notification data is sent to the personal device 106, the notification data may provide one or more instructions to assist in enabling the application and/or the notification data may include a link or other selectable portion that, when selected, may cause a user interface to be displayed on a screen of the personal device 106. The user interface may include an option and/or instructions for enabling the application. In examples where the notification data is sent to the voice-enabled device 102, the notification data may include audio data. Audio corresponding to the audio data may be output via a speaker 120 of the voice-enabled device 102 and the audio may include an instruction to assist in enabling the application. In examples, the audio may include a request that the user provide a responsive user utterance instructing enablement of the application. For example, the audio may include "an application for one of your devices is not enabled, would you like to enable it?" The user may provide a user utterance, such as "yes," and corresponding audio data may be processed by a speech-processing system of the remote system and utilized to enable the application.

Once the application is enabled, and/or if the application was enabled at the time of the request for user account information from the accessory-device system 132, at step 8, the application-enablement queue 152 may provide an indication of application enablement to the provisioning component 160. In examples where the application was not enabled at the time of the request, at step 9, the request data provided by the accessory-device system 132 and/or an indication of the request for information may be retrieved from a request storage component 162. At step 10, the provisioning component 160 may generate response data to be sent to the accessory-device system 132. The response data may be encrypted using one or more public and/or private encryption keys. In other examples, the response data may be exchanged between the remote system 108 and the accessory-device system 132 using an agreed-upon encryption, such as through HTTPS and/or TLS. The response data may include the device identifier(s) for the accessory device 104, the user account information, and/or other information permitted to be shared by the user. It should be understood that any or all of the user account information may only be sent from the remote system to the accessory-device system 132 when a user associated with the user account has provided permission for such information to be sent. Permission may be acquired during the application enablement process and/or at or near the time of the request from the accessory-device system 132. The response data may also, in examples, include a naming indicator associated with the accessory device 104. For example, the remote system and/or the user may have identified and/or assigned a naming indicator such as "Rob's light" to the accessory device 104. That naming indicator may be sent with the response data from the remote system 108 to the accessory-device system 132.

At step 11, the accessory-device system 132, having received the user account information, may send an instruction and/or request data for device discovery, such as proactive device discovery. For example, while the accessory device 104 may be setup in association with the accessory-device system 132, setup of the accessory device 104 with the remote system may not have been performed. In examples, a user may utilize the personal device 106 and/or the voice-enabled device 102 to setup or otherwise "discover" the accessory device 104. In other examples, the remote system may be configured to perform the setup and/or "discovery" without interaction with the user. For example, having received the device-discovery request from the accessory-device system 132, the discovery component 166 may identify and/or determine the device identifier for the accessory device 104, the naming indicator, if any, the user account in question, and/or the device identifier for the voice-enabled device 102 associated with the user account.

Using some or all of this information, the discovery component 166 may associate the device identifier and/or the naming indicator for the accessory device 104 with the user account such that the user may utilize the voice-enabled device 102 and/or the remote system to perform operations associated with the accessory device 104. At step 12, the association between the user account and the accessory device 104 may be stored in association with the user registry 146.

FIGS. 3-6 illustrate processes for secure exchange of information. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1, 2, and 7-10, although the processes may be implemented in a wide variety of other environments, architectures and systems.

Figure 3:
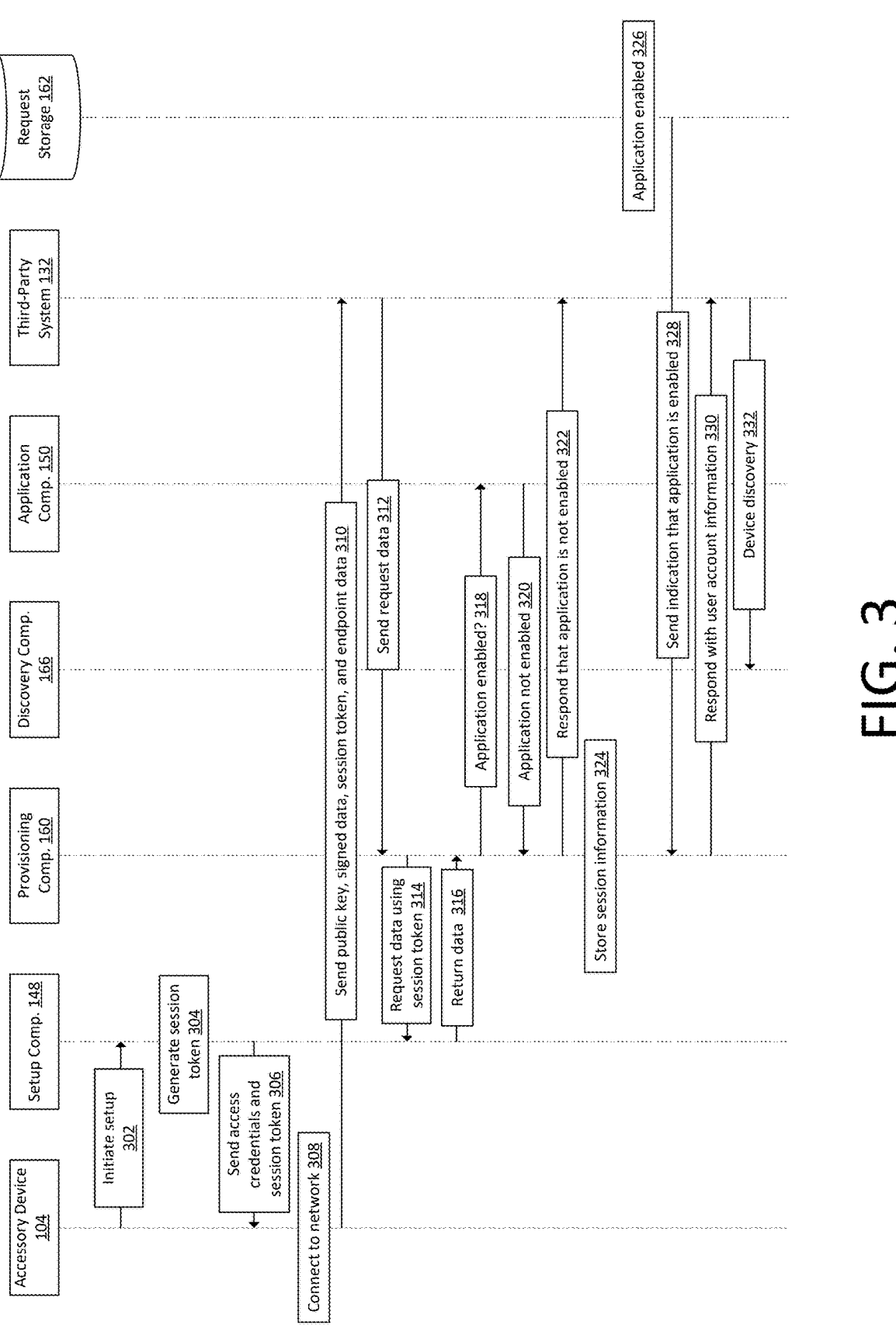
FIG. 3 illustrates a sequence diagram illustrating an example flow of interactions arranged in a time sequence for secure information exchange when an application associated with an accessory is not enabled at the time of a request for information exchange.

FIG. 3 illustrates a sequence diagram illustrating a process 300 with an example flow of interactions arranged in a time sequence for secure information exchange when an application associated with an accessory is not enabled at the time of a request for information exchange. The diagram shows the flow of data between certain components of systems and/or between systems. It should be understood that while specific components have been illustrated in FIG. 3, the processes described with respect to FIG. 3 may be performed by additional and/or different components as otherwise described herein.

At block 302, the process 300 may include initiating setup of an accessory device 104 with a remote system. For example, when the accessory device 104 is plugged in or otherwise acquires power such that a network interface of the accessory device 104 is capable of wirelessly communicating with one or more other devices, the accessory device 104 may send a signal that may be received by a voice-enabled device. The voice-enabled device may send data to a setup component 148 indicating that a new device has been identified and is ready to be setup.

At block 304, the setup component 148 may generate token data for setting up the accessory device 104 in association with the voice-enabled device and/or the remote system. The token data may indicate the device identifier of the accessory device 104 as provided by the accessory device 104 and/or the voice-enabled device associated with network on which the accessory device 104 is communicating.

At block 306, the network access credentials, the token data, and, in examples, a device identifier provided by the remote system for the accessory device 104 may be sent from the setup component 148 to the accessory device 104, such as via the network. The voice-enabled device and/or the accessory device 104 may utilize the network access credentials to allow the accessory device 104, at block 308, to connect to the network and communicate with the voice-enabled device 102 and/or one or more other devices over the network.

At block 310, the process 300 may include the accessory device 104 sending a communication to the accessory-device system 132 associated with the accessory device 104. The communication may include, for example, a public encryption key associated with the accessory-device system 132 and/or the accessory device 104. The token data may be signed by the accessory device 104 using a private encryption key. For example, a private encryption key known to the accessory device 104 and, in examples, an accessory-device system 132, may be stored in association with memory of the accessory device 104 and may be utilized by the accessory device 104 to generate a digital signature associated with token data, as described elsewhere herein. The private encryption key may be a cryptographic key which may represent a string of numbers and/or letters. The private encryption key may be utilized to decrypt information encrypted with a corresponding public encryption key, or vice versa. The key encryption described herein may be utilized to authenticate and encrypt/decrypt data transferred between the remote system and the accessory-device system 132. In examples, the accessory device 104 may utilize the private encryption key, which may be known only to the accessory device 104 and/or the accessory-device system 132, to generate the digital signature, which may be appended or otherwise associated with the token data. In other examples, data other than the token data may be signed as described elsewhere herein.

At block 312, the process 300 may include the accessory-device system 132 sending request data indicating a request to the provisioning component 160 for user account information associated with the user account. The request data may include, for example, the signed token data, the device identifier, and/or an indication of an application, which may be otherwise described herein as a "skill," associated with the accessory-device system 132 and/or the accessory device 104.

At block 314, the process 300 may include the provisioning component 160 identifying the user account associated with the request based at least in part on the token data. For example, the provisioning component 160 may have access to the public encryption key for the accessory-device system 132. The accessory-device system 132 may have provided the public encryption key prior to the processes described herein, for example, and/or the public encryption key may be provided as part of the request data. The provisioning component 160 may determine that the token data has been signed, and/or that the token data has been received along with a digital signature, and may, utilizing the public encryption key, decrypt the token data and/or other data to identify the device identifier of the accessory device 104.

The provisioning component 160 may utilize the token data to identify the user account at issue and/or a customer and/or account identifier at issue. For example, the provisioning component 160 may query the setup component 148 based at least in part on the token data received from the accessory-device system 132. The token data may be analyzed in association with the token data generated by the setup component 148 to identify corresponding token data stored in association with the setup component 148. In examples, a time value associated with generation of the token data by the setup component 148 may be identified, determine, and/or generated and may be analyzed in association with a time value at which the request data was received from the accessory-device system 132. In examples, if the two time values are within a threshold time period, the process of securely exchanging information as described herein may continue. If the two time values are not within a threshold time period, the provisioning component 160 may determine that the process should not continue may be not send user account data to the accessory-device system 132, as otherwise described herein. At block 316, the process 300 may include the setup component 148 sending data indicating the user account at issue to the provisioning component 160.

At block 318, the process 300 may include the provisioning component 160 determining if the application for the accessory-device system 132 indicated in the request data has been enabled in association with the user account. For example, the accessory-device system 132 and/or an entity associated therewith may have developed the application for use in association with the voice-enabled device. In an example where the accessory device 104 is a light bulb, the accessory-device system 132 may have developed an application available to the remote system to allow a user to provide user utterances such as "turn on the light bulb," and the remote system may utilize audio data representing that user utterance along with the functionality of the application to cause the accessory device 104 to perform an action, such as causing the light bulb to emit light. To determine if the application has been enabled, the provisioning component 160 may call the application component 150, which may store data indicating which applications have been enabled in association with a given user account. The application component 150 may store this data, and/or the application component 150 may query the user registry 146 and/or one or more other databases to determine whether a given application is enabled in association with a given user account. At block 320, the process 300 may include the application component 150 returning results to the provisioning component 160 indicating whether the application is enabled.

In the example shown in FIG. 3, the application component 150 may return results to the provisioning component 160 indicating that the application has not been enabled. In these examples, at block 322, the process 300 may include the provisioning component 160 identifying, determining, and/or generating response data to be sent to the accessory-device system 132 indicating that the application has not been enabled.

At block 324, the process 300 may include storing the request data and/or portions thereof in association with a request storage and, in examples, the device identifier for the accessory device 104 may not appear in and/or be retrieved from the user registry 146. The request storage may be utilized to determine when an accessory-device system 132 has requested user account data but, at the time of the request, the application associated with the accessory-device system was not enabled. In this way, the accessory-device system 132 does not need to send multiple, such as periodic, request for the user account information.

A notification component may be configured to generate notification data based at least in part on determining that the application has not been enabled. The notification data may include an alert that the application is not enabled and/or a request to enable the application. The notification data may be sent to a personal device and/or to a voice-enabled device, for example. In examples where the notification data is sent to the personal device, the notification data may provide one or more instructions to assist in enabling the application and/or the notification data may include a link or other selectable portion that, when selected, may cause a user interface to be displayed on a screen of the personal device. The user interface may include an option and/or instructions for enabling the application. In examples where the notification data is sent to the voice-enabled device, the notification data may include audio data. Audio corresponding to the audio data may be output via a speaker of the voice-enabled device and the audio may include an instruction to assist in enabling the application. In examples, the audio may include a request that the user provide a responsive user utterance instructing enablement of the application. For example, the audio may include "an application for one of your devices is not enabled, would you like to enable it?" The user may provide a user utterance, such as "yes," and corresponding audio data may be processed by a speech-processing system of the remote system and utilized to enable the application.

At block 326, the application may be enabled, such as in response to the notification(s) sent as described above. At block 328, the process 300 may include an application-enablement queue providing an indication of application enablement to the provisioning component 160. At block 330, the process 300 may include the provisioning component 160 generating response data to be sent to the accessory-device system 132. The response data may be encrypted using one or more public and/or private encryption keys. The response data may include the device identifier(s) for the accessory device 104, the user account information, and/or other information permitted to be shared by the user. It should be understood that any or all of the user account information may only be sent from the remote system to the accessory-device system 132 when a user associated with the user account has provided permission for such information to be sent. Permission may be acquired during the application enablement process and/or at or near the time of the request from the accessory-device system 132. The response data may also, in examples, include a naming indicator associated with the accessory device 104. For example, the remote system and/or the user may have identified and/or assigned a naming indicator such as "Rob's light" to the accessory device 104. That naming indicator may be sent with the response data from the remote system to the accessory-device system 132.

At block 332, the process 300 may include the accessory-device system 132 sending an instruction and/or request data for device discovery, such as proactive device discovery. For example, while the accessory device 104 may be setup in association with the accessory-device system 132, setup of the accessory device 104 with the remote system may not have been performed. In examples, a user may utilize the personal device and/or the voice-enabled device to setup or otherwise "discover" the accessory device 104. In other examples, the remote system may be configured to perform the setup and/or "discovery" without interaction with the user. For example, having received the device-discovery request from the accessory-device system 132, a discovery component 166 may identify and/or determine the device identifier for the accessory device 104, the naming indicator, if any, the user account in question, and/or the device identifier for the voice-enabled device 102 associated with the user account. Using some or all of this information, the discovery component 166 may associate the device identifier and/or the naming indicator for the accessory device 104 with the user account such that the user may utilize the voice-enabled device 102 and/or the remote system to perform operations associated with the accessory device 104. The association between the user account and the accessory device 104 may be stored in association with the user registry.

Figure 4:
FIG. 4 illustrates a sequence diagram illustrating an example flow of interactions arranged in a time sequence for secure information exchange when an application associated with an accessory is enabled at the time of the request for information exchange.

FIG. 4 illustrates a sequence diagram illustrating a process 400 with an example flow of interactions arranged in a time sequence for secure information exchange when an application associated with an accessory is enabled at the time of the request for information exchange. The diagram shows the flow of data between certain components of systems and/or between systems. It should be understood that while specific components have been illustrated in FIG. 4, the processes described with respect to FIG. 4 may be performed by additional and/or different components as otherwise described herein.

At block 402, the process 400 may include initiating setup of an accessory device 104 with a remote system. For example, when the accessory device 104 is plugged in or otherwise acquires power such that a network interface of the accessory device 104 is capable of wirelessly communicating with one or more other devices, the accessory device 104 may send a signal that may be received by a voice-enabled device. The voice-enabled device may send data to a setup component 148 indicating that a new device has been identified and is ready to be setup.

At block 404, the setup component 148 may generate token data for setting up the accessory device 104 in association with the voice-enabled device and/or the remote system. The token data may indicate the device identifier of the accessory device 104 as provided by the accessory device 104 and/or the voice-enabled device associated with network on which the accessory device 104 is communicating.

At block 406, the network access credentials, the token data, and, in examples, a device identifier provided by the remote system for the accessory device 104 may be sent from the setup component 148 to the accessory device 104, such as via the network. The voice-enabled device and/or the accessory device 104 may utilize the network access credentials to allow the accessory device 104, at block 408, to connect to the network and communicate with the voice-enabled device 102 and/or one or more other devices over the network.

At block 410, the process 400 may include the accessory device 104 sending a communication to the accessory-device system 132 associated with the accessory device 104. The communication may include, for example, a public encryption key associated with the accessory-device system 132 and/or the accessory device 104. The token data may be signed by the accessory device 104 using a private encryption key. For example, a private encryption key known to the accessory device 104 and, in examples, an accessory-device system 132, may be stored in association with memory of the accessory device 104 and may be utilized by the accessory device 104 to generate a digital signature associated with token data, as described elsewhere herein. The private encryption key may be a cryptographic key which may represent a string of numbers and/or letters. The private encryption key may be utilized to decrypt information encrypted with a corresponding public encryption key, or vice versa. The key encryption described herein may be utilized to authenticate and encrypt/decrypt data transferred between the remote system and the accessory-device system 132. In examples, the accessory device 104 may utilize the private encryption key, which may be known only to the accessory device 104 and/or the accessory-device system 132, to generate the digital signature, which may be appended or otherwise associated with the token data. In other examples, data other than the token data may be signed as described elsewhere herein.

At block 412, the process 400 may include the accessory-device system 132 sending request data indicating a request to the provisioning component 160 for user account information associated with the user account. The request data may include, for example, the signed token data (and/or the token data and a digital signature), the device identifier, and/or an indication of an application, which may be otherwise described herein as a "skill," associated with the accessory-device system 132 and/or the accessory device 104.

At block 414, the process 400 may include the provisioning component 160 identifying the user account associated with the request based at least in part on the token data. For example, the provisioning component 160 may have access to the public encryption key for the accessory-device system 132. The accessory-device system 132 may have provided the public encryption key prior to the processes described herein, for example, and/or the public encryption key may be provided as part of the request data. The provisioning component 160 may determine that the token data has been signed, and/or that the token data has been received along with a digital signature, and may, utilizing the public encryption key, decrypt the token data and/or other data to identify the device identifier of the accessory device 104.

The provisioning component 160 may utilize the token data to identify the user account at issue. For example, the provisioning component 160 may query the setup component 148 based at least in part on the token data received from the accessory-device system 132. The token data may be analyzed in association with the token data generated by the setup component 148 to identify corresponding token data stored in association with the setup component 148. In examples, a time value associated with generation of the token data by the setup component 148 may be identified, determine, and/or generated and may be analyzed in association with a time value at which the request data was received from the accessory-device system 132. In examples, if the two time values are within a threshold time period, the process of securely exchanging information as described herein may continue. If the two time values are not within a threshold time period, the provisioning component 160 may determine that the process should not continue may be not send user account data to the accessory-device system 132, as otherwise described herein. At block 416, the process 400 may include the setup component 148 sending data indicating the user account at issue to the provisioning component 160.

At block 418, the process 300 may include the provisioning component 160 determining if the application for the accessory-device system 132 indicated in the request data has been enabled in association with the user account. For example, the accessory-device system 132 and/or an entity associated therewith may have developed the application for use in association with the voice-enabled device. In an example where the accessory device 104 is a light bulb, the accessory-device system 132 may have developed an application available to the remote system to allow a user to provide user utterances such as "turn on the light bulb," and the remote system may utilize audio data representing that user utterance along with the functionality of the application to cause the accessory device 104 to perform an action, such as causing the light bulb to emit light. To determine if the application has been enabled, the provisioning component 160 may call the application component 150, which may store data indicating which applications have been enabled in association with a given user account. The application component 150 may store this data, and/or the application component 150 may query the user registry 146 and/or one or more other databases to determine whether a given application is enabled in association with a given user account. At block 420, the process 400 may include the application component 150 returning results to the provisioning component 160 indicating whether the application is enabled.

In the example shown in FIG. 4, the application component 150 may return results to the provisioning component 160 indicating that the application has been enabled. In these examples, at block 422, the process 400 may include the provisioning component 160 identifying, determining, and/or generating response data to be sent to the accessory-device system 132 indicating that the application has been enabled.

At block 424, the process 400 may include storing the session information and/or portions thereof in association with a request storage. At block 426, the process 400 may include the provisioning component 160 generating response data to be sent to the accessory-device system 132. The response data may be encrypted using one or more public and/or private encryption keys. The response data may include the device identifier(s) for the accessory device 104, the user account information, and/or other information permitted to be shared by the user. It should be understood that any or all of the user account information may only be sent from the remote system to the accessory-device system 132 when a user associated with the user account has provided permission for such information to be sent. Permission may be acquired during the application enablement process and/or at or near the time of the request from the accessory-device system 132. The response data may also, in examples, include a naming indicator associated with the accessory device 104. For example, the remote system and/or the user may have identified and/or assigned a naming indicator such as "Rob's light" to the accessory device 104. That naming indicator may be sent with the response data from the remote system to the accessory-device system 132.

At block 428, the process 400 may include the accessory-device system 132 sending an instruction and/or request data for device discovery, such as proactive device discovery. For example, while the accessory device 104 may be setup in association with the accessory-device system 132, setup of the accessory device 104 with the remote system may not have been performed. In examples, a user may utilize the personal device and/or the voice-enabled device to setup or otherwise "discover" the accessory device 104. In other examples, the remote system may be configured to perform the setup and/or "discovery" without interaction with the user. For example, having received the device-discovery request from the accessory-device system 132, a discovery component 166 may identify and/or determine the device identifier for the accessory device 104, the naming indicator, if any, the user account in question, and/or the device identifier for the voice-enabled device 102 associated with the user account. Using some or all of this information, the discovery component 166 may associate the device identifier and/or the naming indicator for the accessory device 104 with the user account such that the user may utilize the voice-enabled device 102 and/or the remote system to perform operations associated with the accessory device 104. The association between the user account and the accessory device 104 may be stored in association with the user registry.

FIG. 5 illustrates a flow diagram of an example process for secure information exchange. The order in which the operations or steps are described is not intended to be construed as a limitation, and any number of the described operations may be combined in any order and/or in parallel to implement process 500.

At block 502, the process 500 may include receiving, from an accessory device, first data representing a first request for network access credentials to establish a network connection. For example, when the accessory device is plugged in or otherwise acquires power such that a network interface of the accessory device is capable of wirelessly communicating with one or more other devices, the accessory device may send a signal that may be received by a voice-enabled device. The voice-enabled device may send data to a setup component of a remote system indicating that a new device has been identified and is ready to be setup. In other examples, the accessory device may send the data to a setup component of the remote system without the use of the voice-enabled device. As used herein, a network connection occurs when two or more devices are connected such that data can be sent to and from the devices, such as wirelessly. A network connection may be established when a device is connected to a local area network and can send and receive information over a wide area network, such as the internet, for example, with another device that is connected to a separate local area network. In examples, access credentials may be utilized to connect a given device to a local area network, and/or permissions may be used to access the wide area network.

At block 504, the process 500 may include generating token data for a session to configure the accessory device for use, the token data representing a unique identifier of the session and identifying a device identifier of the accessory device. For example, the token data may indicate the device identifier of the accessory device as provided by the accessory device and/or the voice-enabled device associated with network on which the accessory device is communicating. The network access credentials, the token data, and, in examples, a device identifier provided by the remote system for the accessory device may be sent from the setup component to the accessory device, such as via the network. The voice-enabled device and/or the accessory device may utilize the network access credentials to allow the accessory device to connect to the network and communicate with the voice-enabled device and/or one or more other devices over the network.

The accessory device may send a communication to an accessory-device system associated with the accessory device. The communication may include, for example, a public encryption key associated with the accessory-device system and/or the accessory device. The token data and/or other data may be signed by the accessory device using a private encryption key. For example, a private encryption key known to the accessory device and, in examples, an accessory-device system, may be stored in association with memory of the accessory device and may be utilized by the accessory device to generate a digital signature associated with token data, as described elsewhere herein. The private encryption key may be a cryptographic key which may represent a string of numbers and/or letters. The private encryption key may be utilized to decrypt information encrypted with a corresponding public encryption key, or vice versa. The key encryption described herein may be utilized to authenticate and encrypt/decrypt data transferred between the remote system and the accessory-device system. In examples, the accessory device may utilize the private encryption key, which may be known only to the accessory device and/or the accessory-device system, to generate the digital signature, which may be appended or otherwise associated with the token data.

At block 506, the process 500 may include associating the device identifier with a user account. For example, the setup component of the remote system may store data indicating that the device identifier and the user account are associated with the token data. Additionally, in examples, the setup component may store data indicating that the voice-enabled device is associated with the accessory device. In examples, the user account may be a user account that is associated with the voice-enabled device and/or one or more applications executable by the voice-enabled device. In other examples, the user account may be an account associated with a user even if no voice-enabled device is associated with the user account.

At block 508, the process 500 may include receiving, from a remote system associated with the accessory device, such as the accessory-device system, second data representing a second request for account information associated with the user account, the second data including the token data. For example, the accessory-device system may send request data indicating a request to a provisioning component of the remote system for user account information associated with the user account. The request data may include, for example, the signed token data and/or other data, the device identifier, and/or an indication of an application, which may be otherwise described herein as a "skill," associated with the accessory-device system and/or the accessory device.

At block 510, the process 500 may include in response to receiving the second data including the token data, determining that a skill associated with the accessory-device system is enabled for use by the user account. For example, the provisioning component may identify the user account associated with the request based at least in part on the token data. The provisioning component may have access to the public encryption key for the accessory-device system. The accessory-device system may have provided the public encryption key prior to the processes described herein, for example, and/or the public encryption key may be provided as part of the request data. The provisioning component may determine that the token data has been signed, and/or that the token data has been received along with a digital signature, and may, utilizing the public encryption key, decrypt the token data and/or other data to identify the device identifier of the accessory device.

The provisioning component may utilize the token data to identify the user account at issue. For example, the provisioning component may query the setup component based at least in part on the token data received from the accessory-device system. The token data may be analyzed in association with the token data generated by the setup component to identify corresponding token data stored in association with the setup component. In examples, a time value associated with generation of the token data by the setup component may be identified, determine, and/or generated and may be analyzed in association with a time value at which the request data was received from the accessory-device system. In examples, if the two time values are within a threshold time period, the process of securely exchanging information as described herein may continue. If the two time values are not within a threshold time period, the provisioning component may determine that the process should not continue may be not send user account data to the accessory-device system, as otherwise described herein.

The provisioning component may then determine if the skill for the accessory-device system indicated in the request data has been enabled in association with the user account. For example, the accessory-device system and/or an entity associated therewith may have developed the skill for use in association with the voice-enabled device. In an example where the accessory device is a light bulb, the accessory-device system may have developed a skill available to the remote system to allow a user to provide user utterances such as "turn on the light bulb," and the remote system may utilize audio data representing that user utterance along with the functionality of the skill to cause the accessory device to perform an action, such as causing the light bulb to emit light. To determine if the skill has been enabled, the provisioning component may call an application component, which may store data indicating which skills have been enabled in association with a given user account. The application component may store this data, and/or the application component may query a user registry and/or one or more other databases to determine whether a given skill is enabled in association with a given user account.

At block 512, the process 500 may include generating, in response to determining that the skill is enabled, third data including the account information. The response data may be encrypted using one or more public and/or private encryption keys. The response data may include the device identifier(s) for the accessory device, the user account information, and/or other information permitted to be shared by the user. It should be understood that any or all of the user account information may only be sent from the remote system to the accessory-device system when a user associated with the user account has provided permission for such information to be sent. Permission may be acquired during the application enablement process and/or at or near the time of the request from the accessory-device system. The response data may also, in examples, include a naming indicator associated with the accessory device. For example, the remote system and/or the user may have identified and/or assigned a naming indicator such as "Rob's light" to the accessory device. That naming indicator may be sent with the response data from the remote system to the accessory-device system.

At block 514, the process 500 may include sending the third data to the accessory-device system, the third data associating the account information with the device identifier. The accessory-device system, having received the response data, may then use the response data to identify the user account associated with the accessory device and communicate with the remote system using the user account identifier.

Additionally, or alternatively, the process 500 may include receiving a public encryption key associated with the accessory-device system, where the public encryption key may be associated with a private encryption key stored in association with the accessory device. The process 500 may also include determining, using the public encryption key, that a digital signature signing the token data and/or other data was generated using the private encryption key. In these examples, generating the response data may be based at least in part on determining that the digital signature was generated using the private encryption key.

Additionally, or alternatively, the process 500 may include determining that the application is disabled at the time the request data is received from the accessory-device system and sending, based at least in part on the application being disabled, notification data requesting that the application be enabled to an electronic device associated with the user account. For example, the provisioning component may query a database, such as a user registry and/or an application component for data indicating whether the application is enabled or not. When a user and/or accessory-device system enables an application, such as the enablement of a skill, data indicating enablement of the application may be stored in association with the user registry and/or the application component. The process 500 may also include receiving, from the electronic device, enablement data enabling the application for use by the user account. In these examples, determining that the application is enabled may be based at least in part on the enablement data. As used in this disclosure, "disabled" may including "un-enabled" and/or "not yet enabled" and/or "not currently enabled" and/or in a state that is not enabled.

Additionally, or alternatively, the process 500 may include receiving, form the accessory-device system, a device-discovery request indicating a naming indicator for the accessory device. The device-discovery request may include the device identifier and an account identifier associated with the user account. The process 500 may also include causing, based at least in part on the device-discovery request, the naming indicator to be associated with the account identifier. The process 500 may also include storing, in association with the user account, an indication that the accessory device is enabled for use by the voice-enabled device.

FIG. 6 illustrates a flow diagram of another example process for secure information exchange. The order in which the operations or steps are described is not intended to be construed as a limitation, and any number of the described operations may be combined in any order and/or in parallel to implement process 600.

At block 602, the process 600 may include generating token data associated with a session to configure an electronic device for use. For example, the token data may indicate the device identifier of the electronic device as provided by the electronic device and/or a voice-enabled device associated with a network on which the electronic device is communicating. The network access credentials, the token data, and, in examples, a device identifier provided by a remote system for the electronic device may be sent from the setup component to the electronic device, such as via the network. The voice-enabled device and/or the electronic device may utilize the network access credentials to allow the electronic device to connect to the network and communicate with the voice-enabled device and/or one or more other devices over the network.

The electronic device may send a communication to a second system associated with the electronic device, otherwise described as a system associated with the electronic device. The communication may include, for example, a public encryption key associated with the second system and/or the electronic device. The token data and/or other data may be signed by the electronic device using a private encryption key. For example, a private encryption key known to the electronic device and, in examples, the second system, may be stored in association with memory of the electronic device and may be utilized by the electronic device to generate a digital signature associated with token data, as described elsewhere herein. The private encryption key may be a cryptographic key which may represent a string of numbers and/or letters. The private encryption key may be utilized to decrypt information encrypted with a corresponding public encryption key, or vice versa. The key encryption described herein may be utilized to authenticate and encrypt/decrypt data transferred between the remote system and the second system. In examples, the electronic device may utilize the private encryption key, which may be known only to the electronic device and/or the second system, to generate the digital signature, which may be appended or otherwise associated with the token data.

At block 604, the process 600 may include associating a device identifier with a user account, the device identifier representing the electronic device. For example, the setup component of the remote system may store data indicating that the device identifier and the user account are associated with the token data. Additionally, in examples, the setup component may store data indicating that a voice-enabled device is associated with the electronic device.

At block 606, the process 600 may include receiving, from a system associated with the electronic device, first data representing a request for account information associated with the user account, the first data including the token data. For example, the system may send request data indicating a request to a provisioning component of the remote system for user account information associated with the user account. The request data may include, for example, the signed token data and/or other signed data, the device identifier, and/or an indication of an application, which may be otherwise described herein as a "skill," associated with the second system and/or the electronic device.

At block 608, the process 600 may include based at least in part on the first data including the token data, determining that an application associated with the system has been enabled for use in association with the user account. For example, the provisioning component may identify the user account associated with the request based at least in part on the token data. The provisioning component may have access to the public encryption key for the second system. The second system may have provided the public encryption key prior to the processes described herein, for example, and/or the public encryption key may be provided as part of the request data. The provisioning component may determine that the token data has been signed, and/or that the token data has been received along with a digital signature, and may, utilizing the public encryption key, decrypt the token data to identify the device identifier of the electronic device.

The provisioning component may utilize the token data to identify the user account at issue. For example, the provisioning component may query the setup component based at least in part on the token data received from the second system. The token data may be analyzed in association with the token data generated by the setup component to identify corresponding token data stored in association with the setup component. In examples, a time value associated with generation of the token data by the setup component may be identified, determine, and/or generated and may be analyzed in association with a time value at which the request data was received from the second system. In examples, if the two time values are within a threshold time period, the process of securely exchanging information as described herein may continue. If the two time values are not within a threshold time period, the provisioning component may determine that the process should not continue may be not send user account data to the second system, as otherwise described herein.

The provisioning component may then determine if the application for the second system indicated in the request data has been enabled in association with the user account. For example, the second system and/or an entity associated therewith may have developed the application for use in association with the voice-enabled device. In an example where the accessory device is a light bulb, the second system may have developed an application available to the remote system to allow a user to provide user utterances such as "turn on the light bulb," and the remote system may utilize audio data representing that user utterance along with the functionality of the application to cause the electronic device to perform an action, such as causing the light bulb to emit light. To determine if the application has been enabled, the provisioning component may call an application component, which may store data indicating which applications have been enabled in association with a given user account. The application component may store this data, and/or the application component may query a user registry and/or one or more other databases to determine whether a given application is enabled in association with a given user account.

At block 610, the process 600 may include generating, based at least in part on determining that the application has been enabled, response data including the account information. The response data may be encrypted using one or more public and/or private encryption keys. The response data may include the device identifier(s) for the electronic device, the user account information, and/or other information permitted to be shared by the user. It should be understood that any or all of the user account information may only be sent from the remote system to the second system when a user associated with the user account has provided permission for such information to be sent. Permission may be acquired during the application enablement process and/or at or near the time of the request from the second system. The response data may also, in examples, include a naming indicator associated with the electronic device. For example, the remote system and/or the user may have identified and/or assigned a naming indicator such as "Rob's light" to the electronic device. That naming indicator may be sent with the response data from the remote system to the second system. In other examples, other components of the remote system may generate the response data and/or components of another device and/or system, such as the voice-enabled device, may generate the response data.

At block 612, the process 600 may include causing second data, otherwise described herein as response data, representing a response to the request to be sent to the system, the second data associating the account information with the device identifier. The second system, having received the response data, may then use the response data to identify the user account associated with the electronic device and communicate with the remote system using the user account identifier.

Additionally, or alternatively, the process 600 may include receiving a public encryption key associated with the second system, where the public encryption key may be associated with a private encryption key stored in association with the electronic device. The process 600 may also include determining, using the public encryption key, that a digital signature signing the token data and/or other data was generated using the private encryption key. In these examples, generating the response data may be based at least in part on determining that the digital signature was generated using the private encryption key.

Additionally, or alternatively, the process 600 may include determining that the application is disabled at the time the request data is received from the second system and sending, based at least in part on the application being disabled, notification data requesting that the application be enabled to a voice-enabled device and/or a personal device associated with the user account. The process 600 may also include receiving, from the voice-enabled device and/or the personal device, enablement data enabling the application for use by the user account. The process 600 may also include causing the application to be enabled based at least in part on the enablement data. In these examples, determining that the application is enabled may be based at least in part on causing the application to be enabled.

Additionally, or alternatively, the process 600 may include receiving, form the second system, a device-discovery request indicating a naming indicator for the accessory device. The device-discovery request may include the device identifier and an account identifier associated with the user account. The process 600 may also include causing, based at least in part on the device-discovery request, the naming indicator to be associated with the account identifier. The process 600 may also include storing, in association with the user account, an indication that the accessory device is enabled for use by the voice-enabled device.

Additionally, or alternatively, the process 600 may include identifying a second application associated with the second system and determining that the request data indicates that the account information is requested for the first application and the second application. In these examples, the first application may be associated with a first set of functionality, such as enablement and/or disablement of an accessory device, while the second application may be associated with a second set of functionality, such as the output of content by the accessory device. The process 600 may also include determining that the second application is disabled for use by the user account and sending, to a user device associated with the user account, notification data requesting that the second application be enabled. The process 600 may also include receiving an indication that the second application has been enabled and sending second response data to the second system associating the account information with the second application.

Additionally, or alternatively, the process 600 may include receiving, from the electronic device, setup data for associating the electronic device with the user account, where the setup data includes the device identifier corresponding to the electronic device. The process 600 may also include identifying network-access data associated with the user account, where the network-access data may indicate network access credentials for accessing the network. The process 600 may also include sending the network-access data to the electronic device such that the electronic device is enabled to wirelessly connect to the first system and the second system. The process 600 may also include sending, using a wireless connection, the token data to the electronic device.

Additionally, or alternatively, the process 600 may include receiving, from the electronic device, configuration data indicating an attribute associated with the electronic device and generating a naming indicator for the electronic device based at least in part on the configuration data. In these examples, the response data may include the naming indicator.

Additionally, or alternatively, the process 600 may include associating a first time value with the token data, where the first time value may indicate at least one of a time of day or a day associated with generating the token data. The process 600 may also include determining a second time value associated with when the request data was received from the second system. The process 600 may also include determining that the second time value is within a threshold time period from the first time value. In these examples, generating the response data may be based at least in part on the second time value being within the threshold time period from the first time value.

Figure 7:
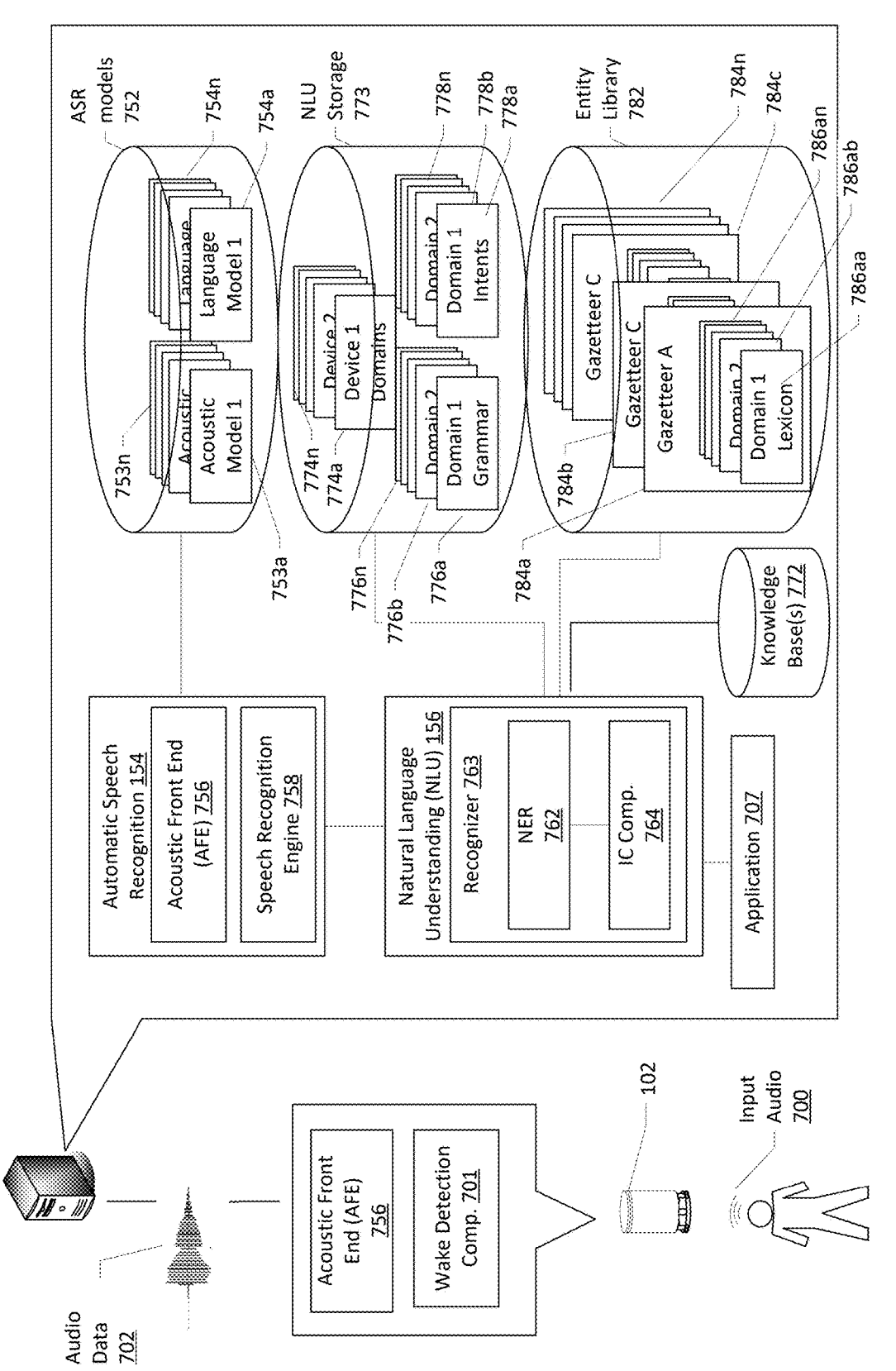
FIG. 7 illustrates a conceptual diagram of components of a speech-processing system for processing audio data provided by one or more devices.

FIG. 7 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin sending audio data to a remote system, such as system 108). The various components illustrated may be located on a same or different physical devices. Message between various components illustrated in FIG. 7 may occur directly or across a network 110. An audio capture component, such as a microphone 118 of the device 102, or another device, captures audio 700 corresponding to a spoken utterance. The device 102, using a wake-word component 701, then processes audio data corresponding to the audio 700 to determine if a keyword (such as a wakeword) is detected in the audio data. Following detection of a wakeword, the device 102 sends audio data 702 corresponding to the utterance to the remote system 108 that includes an ASR component 154. The audio data 702 may be output from an optional acoustic front end (AFE) 756 located on the device prior to transmission. In other instances, the audio data 702 may be in a different form for processing by a remote AFE 756, such as the AFE 756 located with the ASR component 154 of the remote system 108.

The wake-word component 701 works in conjunction with other components of the user device, for example a microphone to detect keywords in audio 700. For example, the device may convert audio 700 into audio data, and process the audio data with the wake-word component 701 to determine whether human sound is detected, and if so, if the audio data comprising human sound matches an audio signature and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input: the energy levels of the audio input in one or more spectral bands: the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake-word component 701 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wake-word component 701 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102 may "wake" and begin transmitting audio data 702 corresponding to input audio 700 to the remote system 108 for speech processing. Audio data corresponding to that audio may be sent to remote system 108 for routing to a recipient device or may be sent to the remote system 108 for speech processing for interpretation of the included speech (either for purposes of enabling voice-messages and/or for purposes of executing a command in the speech). The audio data 702 may include data corresponding to the wakeword, or the portion of the audio data corresponding to the wakeword may be removed by the local device 102 prior to sending. Further, a local device may "wake" upon detection of speech/spoken audio above a threshold, as described herein. Upon receipt by the remote system 108, an ASR component 154 may convert the audio data 702 into text. The ASR transcribes audio data into text data representing the words of the speech contained in the audio data 702. The text data may then be used by other components for various purposes, such as executing system commands, inputting data, etc. A spoken utterance in the audio data is input to a processor configured to perform ASR which then interprets the utterance based on the similarity between the utterance and pre-established language models 754 stored in an ASR model knowledge base (ASR Models Storage 752). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 753 stored in an ASR Models Storage 752), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 154 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 756 and a speech recognition engine 758. The acoustic front end (AFE) 756 transforms the audio data from the microphone into data for processing by the speech recognition engine 758. The speech recognition engine 758 compares the speech recognition data with acoustic models 753, language models 754, and other data models and information for recognizing the speech conveyed in the audio data. The AFE 756 may reduce noise in the audio data and divide the digitized audio data into frames representing time intervals for which the AFE 756 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 758 may process the output from the AFE 756 with reference to information stored in speech/model storage (752). Alternatively, post front-end processed data (such as feature vectors) may be received by the device executing ASR processing from another source besides the internal AFE. For example, the user device may process audio data into feature vectors (for example using an on-device AFE 756) and transmit that information to a server across a network for ASR processing. Feature vectors may arrive at the remote system 108 encoded, in which case they may be decoded prior to processing by the processor executing the speech recognition engine 758.

The speech recognition engine 758 attempts to match received feature vectors to language phonemes and words as known in the stored acoustic models 753 and language models 754. The speech recognition engine 758 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, discover new devices." The wake detection component may identify the wake word, otherwise described as a trigger expression, "Alexa," in the user utterance and may "wake" based on identifying the wake word. Audio data corresponding to the user utterance may be sent to the remote system 108, where the speech recognition engine 758 may identify, determine, and/or generate text data corresponding to the user utterance, here "discover new device."

The speech recognition engine 758 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 758 to other processing components, which may be local to the device performing ASR and/or distributed across the network(s). For example, ASR results in the form of a single textual representation of the speech, an N-best list including multiple hypotheses and respective scores, lattice, etc. may be sent to the remote system 108, for natural language understanding (NLU) processing, such as conversion of the text into commands for execution, either by the user device, by the remote system 108, or by another device (such as a server running a specific application like a search engine, etc.).

The device performing NLU processing 148 (e.g., server 108) may include various components, including potentially dedicated processor(s), memory, storage, etc. As shown in FIG. 7, an NLU component 156 may include a recognizer 763 that includes a named entity recognition (NER) component 762 which is used to identify portions of query text that correspond to a named entity that may be recognizable by the system. A downstream process called named entity resolution links a text portion to a specific entity known to the system. To perform named entity resolution, the system may utilize gazetteer information (784a-784n) stored in entity library storage 782. The gazetteer information may be used for entity resolution, for example matching ASR results with different entities (such as voice-enabled devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 154 based on the utterance input audio 700) and attempts to make a semantic interpretation of the text. That is, the NLU process determines the meaning behind the text based on the individual words and then implements that meaning. NLU processing 156 interprets a text string to derive an intent or a desired action from the user as well as the pertinent pieces of information in the text that allow a device (e.g., device 102) to complete that action. For example, if a spoken utterance is processed using ASR 154 and outputs the text "discover new devices" the NLU process may determine that the user intended to associate accessory devices with the voice-enabled device and/or the remote system.

The NLU may process several textual inputs related to the same utterance. For example, if the ASR 154 outputs N text segments (as part of an N-best list), the NLU may process all N outputs to obtain NLU results.

As will be discussed further below, the NLU process may be configured to parse and tag to annotate text as part of NLU processing. For example, for the text "discover new devices," "discover" may be tagged as a command (to identify newly-connected accessory devices) and "new devices" may be tagged as the naming identifier of the devices to be discovered.

To correctly perform NLU processing of speech input, an NLU process 156 may be configured to determine a "domain" of the utterance so as to determine and narrow down which services offered by the endpoint device (e.g., remote system 108 or the user device) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 762 receives a query in the form of ASR results and attempts to identify relevant grammars and lexical information that may be used to construe meaning. To do so, the NLU component 156 may begin by identifying potential domains that may relate to the received query. The NLU storage 773 includes a database of devices (774a-774n) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "banking," health care," "smart home," "communications," "shopping," "music," "calendaring," etc. As such, each domain may be associated with a particular recognizer 763, language model and/or grammar database (776a-776n), a particular set of intents/actions (778a-778n), and a particular personalized lexicon (786). Each gazetteer (784a-784n) may include domain-indexed lexical information associated with a particular user and/or device. For example, the Gazetteer A (784a) includes domain-index lexical information 786aa to 786an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 764 parses the query to determine an intent or intents for each identified domain, where the intent corresponds to the action to be performed that is responsive to the query. Each domain is associated with a database (778a-778n) of words linked to intents. For example, a communications intent database may link words and phrases such as "discover," "find," "connect," to a "discover" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC component 764 identifies potential intents for each identified domain by comparing words in the query to the words and phrases in the intents database 778. In some instances, the determination of an intent by the IC component 764 is performed using a set of rules or templates that are processed against the incoming text to identify a matching intent.

In order to generate a particular interpreted response, the NER 762 applies the grammar models and lexical information associated with the respective domain to actually recognize a mention of one or more entities in the text of the query. In this manner, the NER 762 identifies "slots" or values (i.e., particular words in query text) that may be needed for later command processing. Depending on the complexity of the NER 762, it may also label each slot with a type of varying levels of specificity (such as noun, place, device name, device location, city, artist name, song name, amount of time, timer number, or the like). Each grammar model 776 includes the names of entities (i.e., nouns) commonly found in speech about the particular domain (i.e., generic terms), whereas the lexical information 786 from the gazetteer 784 is personalized to the user(s) and/or the device. For instance, a grammar model associated with the shopping domain may include a database of words commonly used when people discuss shopping.

The intents identified by the IC component 764 are linked to domain-specific grammar frameworks (included in 776) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "discover" is an identified intent, a grammar (776) framework or frameworks may correspond to sentence structures such as "discover {new devices} accessory devices."

For example, the NER component 762 may parse the query to identify words as subject, object, verb, preposition, etc., based on grammar rules and/or models, prior to recognizing named entities. The identified verb may be used by the IC component 764 to identify intent, which is then used by the NER component 762 to identify frameworks. A framework for the intent of "play a song," meanwhile, may specify a list of slots/fields applicable to play the identified "song" and any object modifier (e.g., specifying a music collection from which the song should be accessed) or the like. The NER component 762 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 762 may search the database of generic words associated with the domain (in the knowledge base 772). So, for instance, if the query was "discover new devices," after failing to determine which user account to initiate a communication channel with, the NER component 762 may search the domain vocabulary for the phrase "new devices". In the alternative, generic words may be checked before the gazetteer information, or both may be tried, potentially producing two different results.

The output data from the NLU processing (which may include tagged text, commands, etc.) may then be sent to an application 707. The destination application 707 may be determined based on the NLU output. For example, if the NLU output includes a command to send a message, the destination application 707 may be a message sending application, such as one located on the user device or in a message sending appliance, configured to execute a message sending command. If the NLU output includes a search request, the destination application 707 may include a search engine processor, such as one located on a search server, configured to execute a search command. After the appropriate command is generated based on the intent of the user, the application 707 may provide some or all of this information to a text-to-speech (TTS) engine. The TTS engine may then generate an actual audio file for outputting the audio data determined by the application 707 (e.g., "okay," or "new devices found"). After generating the file (or "audio data"), the TTS engine may provide this data back to the remote system 108.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 156 during runtime operations where NLU operations are performed on text (such as text output from an ASR component 154). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 763. Each recognizer may include various NLU components such as an NER component 762, IC component 764 and other components such as an entity resolver, or other components.

For example, a messaging domain recognizer 763-A (Domain A) may have an NER component 762-A that identifies what slots (i.e., portions of input text) may correspond to particular words relevant to that domain. The words may correspond to entities such as (for the messaging domain) a recipient. An NER component 762 may use a machine learning model, such as a domain specific conditional random field (CRF) to both identify the portions corresponding to an entity as well as identify what type of entity corresponds to the text portion. The messaging domain recognizer 763-A may also have its own intent classification (IC) component 764-A that determines the intent of the text assuming that the text is within the proscribed domain. An IC component may use a model, such as a domain specific maximum entropy classifier to identify the intent of the text, where the intent is the action the user desires the system to perform. For this purpose, the remote system computing device 108 may include a model training component. The model training component may be used to train the classifier(s)/machine learning models discussed above.

As noted above, multiple devices may be employed in a single speech-processing system. In such a multi-device system, each of the devices may include different components for performing different aspects of the speech processing. The multiple devices may include overlapping components. The components of the user device and the remote system 108, as illustrated herein are exemplary, and may be located in a stand-alone device or may be included, in whole or in part, as a component of a larger device or system, may be distributed across a network or multiple devices connected by a network, etc.

Figure 8:
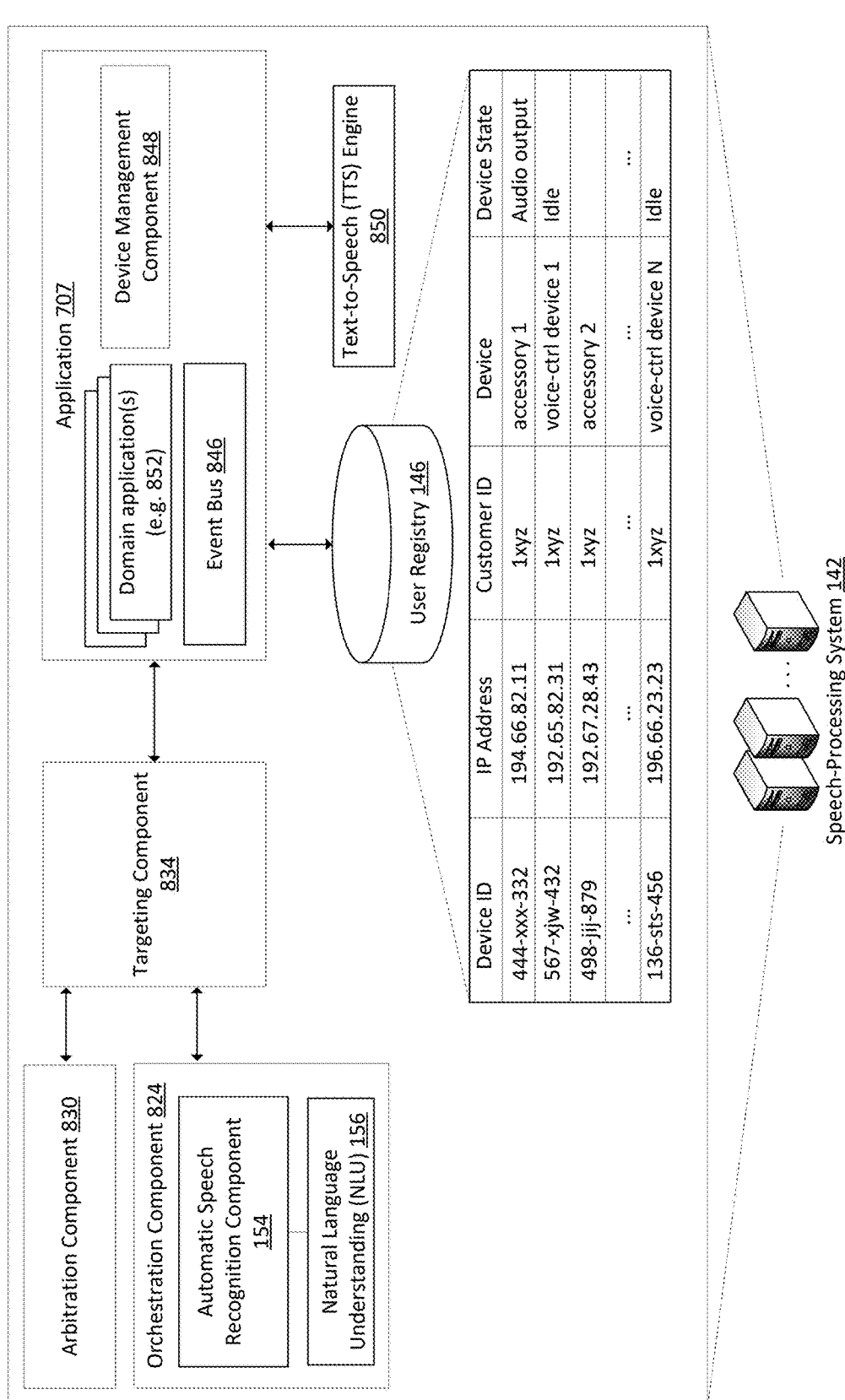
FIG. 8 illustrates a conceptual diagram of components of a speech-processing system for secure information exchange.

FIG. 8 illustrates a conceptual diagram of components of a speech-processing system 142 associating audio output commands with multiple devices, including an application 707 configured to generate a command that the selected voice-enabled device uses to respond to a user utterance. As used with respect to FIG. 8, a voice-enabled device may include a voice-enabled device 102, such as described with respect to FIG. 1. As illustrated in FIG. 8, the speech-processing system 142, including the orchestration component 824 comprising the ASR component 154 and the NLU component 156, may be coupled to the targeting component 834 and provide the targeting component 834 with the intent determined to be expressed in the user utterance. Further, the arbitration component 830 may provide the ranked list of devices to the targeting component 834, as well as device indicators (e.g., IP addresses, devices names, etc.) for one or more of the voice-enabled devices in the ranked list of devices. The targeting component 834 may then perform techniques to determine a target device (e.g., a device to perform the requested operation), and provide various data to the application 707. For instance, the targeting component 834 may provide the application 707 with various device identifiers of the voice-enabled devices, the determined target device, the determined intent and/or command, etc.

The application 707 and/or NLU component 156 may determine a domain based on the intent and, based on this determination, route the request corresponding to the audio data to the appropriate domain application, such as the illustrated domain applications 852. The domain application 852 may comprise any type of device or group of devices (e.g., hardware device, virtual devices or partitions, server, etc.), and may receive the text data and/or an intent associated with the audio signals and may determine how to respond to the request. For instance, the intent for a command "discover new devices" may be routed to an application that controls discovery of newly-connected accessory devices.

Various types of domain applications 852 may be used to determine which devices to send commands to and/or to use in response to a user utterance, as well as the appropriate response and potential additional content (e.g., audio data). For example, the domain applications 852 may include a third party application domain application 852, which may handle intents associated with banking, healthcare, gaming, productivity, etc., a music domain application, which may handle intents associated with music play requests (e.g., Amazon Music, Pandora, Spotify, iHeart, etc.), and/or an information domain application, which may handle requests for information associated, for example, with the status of a particular device and/or content being utilized and/or output by a particular device and/or group of devices.

After the domain application 852 generates the appropriate command, which may be described herein as directive data, based on the intent of the user, and/or provides additional content, such as audio data, to be output by one of the voice-enabled devices, the domain application 852 may provide this information back to the speech system 142, which in turns provides some or all of this information to a text-to-speech (TTS) engine 850. The TTS engine 850 then generates an actual audio file for outputting the second audio data determined by the domain application 852. After generating the file (or "audio data"), the TTS engine 850 may provide this data back to the speech system 142.

The speech system 142 may then publish (i.e., write) some or all of this information to an event bus 846. That is, the speech system 142 may provide information regarding the initial request (e.g., the speech, the text, the domain/intent, etc.), the response to be provided to the voice-enabled device, or any other information pertinent to the interaction between the voice-enabled device and the speech-processing system 142 to the event bus 846.

Within the speech-processing system 142, one or more components or services may subscribe to the event bus 846 so as to receive information regarding interactions between user devices and the speech-processing system 142. In the illustrated example, for instance, the device management component 848 may subscribe to the event bus 846 and, thus, may monitor information regarding these interactions. In some examples, monitoring information in the event bus 846 may comprise messages between various components of the speech-processing system 142. For example, the targeting component 834 may monitor the event bus 846 to identify device state data for voice-enabled devices. In some examples, the event bus 846 may "push" or send indications of events and/or device state data to the targeting component 834. Additionally, or alternatively, the event bus 846 may be "pulled" where the targeting component 834 sends requests to the event bus 846 to provide an indication of device state data for a voice-enabled device. The event bus 846 may store indications of the device states for the devices, such as in a database (e.g., user registry 146), and using the stored indications of the device states, send the device state data for voice-enabled devices to the targeting component 834. Thus, to identify device state data for a device, the targeting component 834 may send a request to the event bus 846 (e.g., event component) to provide an indication of the device state data associated with a device, and receive, from the event bus 846, the device state data that was requested.

The device management component 848 functions to monitor information published to the event bus 846 and identify events that may trigger action. For instance, the device management component 848 may identify (e.g., via filtering) those events that: (i) come from voice-enabled devices that are associated with secondary device(s) (e.g., have secondary devices in their environments such as televisions, personal computing devices, accessory devices, etc.), and (ii) are associated with supplemental content (e.g., image data, video data, etc.). The device management component 848 may reference the user registry 146 to determine which voice-enabled devices are associated with secondary devices, as well as determine device types, states, and other capabilities of these secondary devices. For instance, the device management component 848 may determine, from the information published to the event bus 846, an identifier associated with the voice-enabled device making the corresponding request or the voice-enabled device selected to respond to or act upon the user utterance. The device management component 848 may use this identifier to identify, from the user registry 146, a user account associated with the voice-enabled device. The device management component 848 may also determine whether any secondary devices have been registered with the identified user account, as well as capabilities of any such secondary devices, such as how the secondary devices are configured to communicate (e.g., via WiFi, short-range wireless connections, etc.), the type of content the devices are able to output (e.g., audio, video, still images, flashing lights, etc.), and the like.

The device management component 848 may determine whether a particular event identified is associated with supplemental content. That is, the device management component 848 may write, to a datastore, indications of which types of events and/or which primary content or responses are associated with supplemental content. In some instances, the speech-processing system 142 may provide access to developers to allow the developers to register supplemental content for output on secondary devices for particular events and/or primary content. For example, if a voice-enabled device is to output that the weather will include thunder and lightning, the device management component 848 may store an indication of supplemental content such as thunder sounds, pictures/animations of lightning and the like. In another example, if a voice-enabled device is outputting information about a particular fact (e.g., "a blue whale is the largest mammal on earth . . . "), then a secondary device, such as television, may be configured to provide supplemental content such as a video or picture of a blue whale. In another example, if a voice-enabled device is outputting audio, then a second device, such as a speaker, may be configured to also output the audio based at least in part on a user utterance representing a request to add the secondary device to the audio session. In these and other examples, the device management component 848 may store an association between the primary response or content (e.g., outputting of information regarding the world's largest mammal) and corresponding supplemental content (e.g., the audio data, image data, or the like). In some instances, the device management component 848 may also indicate which types of secondary devices are to output which supplemental content. For instance, in the instant example, the device management component 848 may store an indication that secondary devices of a class type "tablet" are to output a picture of a blue whale. In these and other instances, meanwhile, the device management component 848 may store the supplemental content in association with secondary-device capabilities (e.g., devices with speakers output the audio commentary, devices with screens output the image, etc.).

The device management component 848 may also determine how to transmit response and/or supplement content (and/or information acquiring the content) to the voice-enabled devices and/or the secondary devices. To make this determination, the device management component 848 may determine a device type of the voice-enabled devices and/or secondary devices, capabilities of the device(s), or the like, potentially as stored in the user registry 146. In some instances, the device management component 848 may determine that a particular device is able to communicate directly with the speech-processing system 142 (e.g., over WiFi) and, thus, the device management component 848 may provide the response and/or content directly over a network 110 to the secondary device (potentially via the speech system 142). In another example, the device management component 848 may determine that a particular secondary device is unable to communicate directly with the speech-processing system 142, but instead is configured to communicate with a voice-enabled device in its environment over short-range wireless networks. As such, the device management component 848 may provide the supplement content (or information) to the speech system 142, which in turn may send this to the voice-enabled device, which may send the information over a short-range network to the secondary device.

The speech-processing system 142 may further include the user registry 146 that includes data regarding user profiles as described herein. The user registry 146 may be located part of, or proximate to, the speech-processing system 142, or may otherwise be in message with various components, for example over the network 110. The user registry 146 may include a variety of information related to individual users, accounts, etc. that interact with the voice-enabled devices, and the speech-processing system 142. For illustration, the user registry 146 may include data regarding the devices associated with particular individual user profiles. Such data may include user or device identifier (ID) and internet protocol (IP) address information for different devices as well as names by which the devices may be referred to by a user. Further qualifiers describing the devices may also be listed along with a description of the type of object of the device. Further, the user registry 146 may store indications of associations between various voice-enabled devices and/or secondary device, such as virtual clusters of devices, states of devices, and associations between devices and audio-session queues. The user registry 146 may represent clusters of devices and/or as single devices that can receive commands and disperse the commands to each device and/or in the cluster. In some examples, the virtual cluster of devices may be represented as a single device which is determined as being capable, or not capable (e.g., offline), of performing a command in a user utterance. A virtual cluster of devices may generally correspond to a stored grouping of devices, or a stored association between a group of devices.

In some examples, the device state for devices associated with a user account may indicate a current state of the device. In this way, the application 707 and/or the domain applications 852 may determine, based on the stored device states in the user registry 146, a current device state of the voice-enabled devices. Rather than receiving device states for the voice-enabled devices, in metadata, the device states may already have been determined or received and stored in the user registry 146. Further, the user registry 146 may provide indications of various permission levels depending on the user. As an example, the speech system 142 may perform speaker recognition on audio signals to determine an identity of the speaker. If the speaker is a child, for instance, the child profile may have permission restrictions where they are unable to request audio to be output via certain devices and/or to output certain audio on one or more of the devices, for example. Conversely, a parent profile may be able to direct output of audio without restrictions.

In some examples, to determine the device state, the event bus 846 may publish different events which indicate device states to various entities or components that subscribe to the event bus 846. For instance, if an event of "discover new devices" occurs for a voice-enabled device, the event bus 846 may publish the indication of this event, and thus the device state of the voice-enabled device from which the audio data was received may be determined. Thus, various components, such as the targeting component 834, may be provided with indications of the various device states via the event bus 846. The event bus 846 may further store and/or update device states for the voice-enabled devices in the user registry 146. The components of the speech-processing system 142 may query the user registry 146 to determine device states.

A particular user profile may include a variety of data that may be used by the system 142. For example, a user profile may include information about what voice-enabled devices are associated with the user and/or user profile. The user profile may further indicate an IP address for each of the devices associated with the user and/or user profile, user IDs for the devices, indications of the types of devices, and current device states for the devices.

Figure 9:
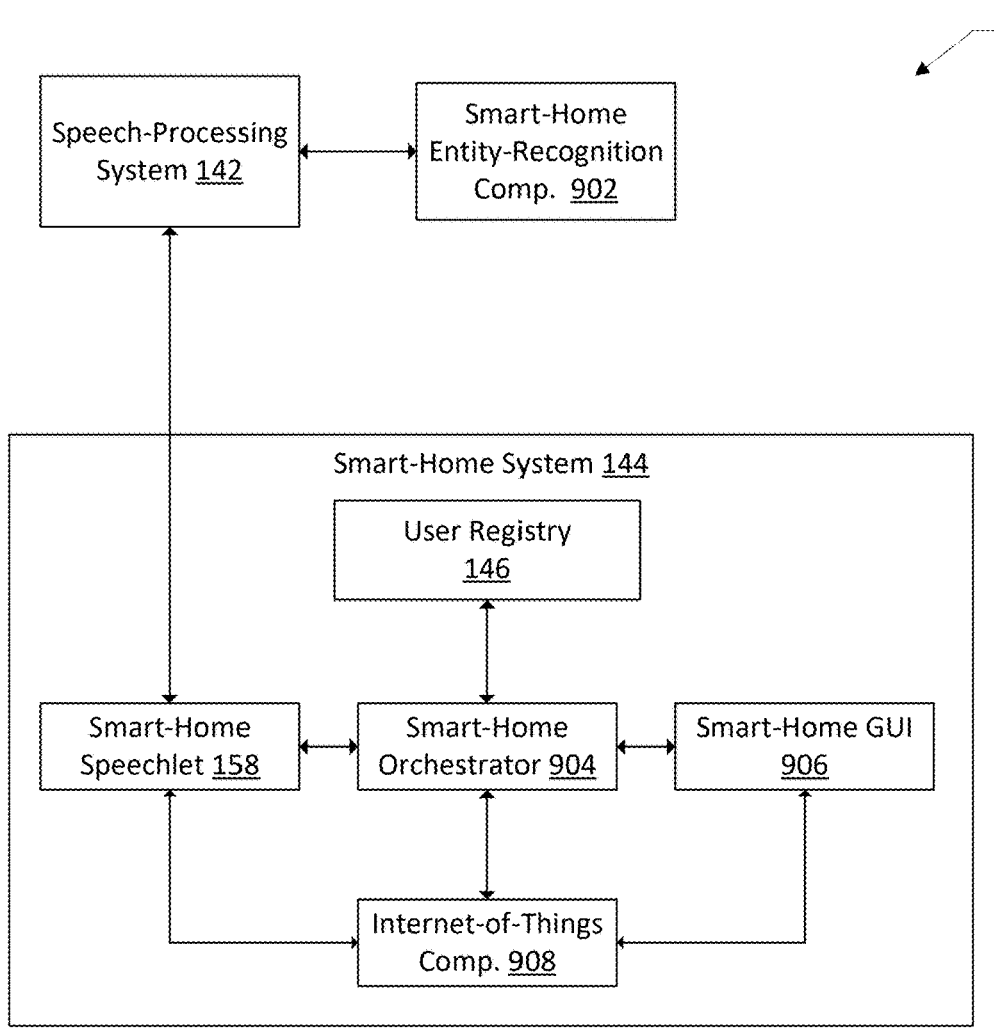
FIG. 9 illustrates a conceptual diagram of example components of a smart-home system.

FIG. 9 illustrates a conceptual diagram of example components of a smart-home system. The smart-home system 144 may include components described above with respect to FIG. 1, such as a smart-home speechlet 158, for example. The smart-home system 144 may also be configured to send data to and receive data from other components of a system and/or one or more other systems. For example, the other components may include a speech-processing system 142. The smart-home system 144 may also include components such as a smart-home orchestrator 904, a smart-home graphical user interface (GUI) 906, and/or an internet-of-things component 908. Each of these components will be described in detail below.

As described herein, a user may interact with an accessory device using tactile input to the accessory device, voice input to a voice-enabled device, and/or input to an application residing on and/or accessible to a personal device. When a user interacts with an accessory device using voice input to a voice-enabled device, audio data representing user utterances may be received at the speech-processing system 142. The speech-processing system 142 may analyze the audio data and/or corresponding text data generated, by way of example, using an ASR component, to determine that the user utterance represents an intent to control an accessory device. To determine the intent associated with the user utterance, the speech-processing system 142 may utilize a smart-home entity-recognition component 902, which may be utilized to inform one or more intents available to the speech-processing system 142 and/or to inform one or more values associated with the intents. For example, the user utterance of "turn off bedroom lights" may be analyzed by the speech-processing system 134. The smart-home entity-recognition component 902 may train or otherwise provide data to the speech-processing system 142 indicating intents associated with operation of accessory devices, such as "turn on," "turn off," "activate," "deactivate," "dim," "brighten," "lock," "unlock," etc. The smart-home entity-recognition component 902 may additionally, or alternatively, provide data indicating identifiers and/or payloads associated with such intents, such as "light," "lights," "lock," "outlet," "switch," etc. It should be understood that while the smart-home entity-recognition component 902 is depicted in FIG. 9 as being a component separate from the smart-home system 144, the smart-home entity-recognition component 902 may be a component of the smart-home system 144.

The speech-processing system 142 may be configured to determine that the intent corresponds to an operation configured to be performed by the smart-home system 144, and based at least in part on such a determination, the speech-processing system 142 may provide the intent data and/or other data associated with the request to the smart-home speechlet 158 of the smart-home system 144. The smart-home orchestrator 904 may be configured to receive data indicating that the smart-home speechlet 158 has been invoked to determine a directive to be performed with respect to an accessory device and may query one or more other components of the smart-home system 144 to effectuate the request. For example, the smart-home orchestrator 904 may query the internet-of-things component 908 to identify naming indicators associated with accessory devices for a particular user account. The internet-of-things component 908 may query data store(s) and/or the user registry 146 and/or the user account for such naming indicators.

In other examples, such as when the smart-home speechlet 144 receives a request to discover an accessory device, such as from an accessory-device system, the smart-home orchestrator 904 may query one or more components of the smart-home system 144 to determine associations between accessory device identifiers and user account identifiers as described herein. Additionally, or alternatively, as mentioned above, the accessory devices may be operated based at least in part on input data received from an application residing on and/or accessible to a personal device, such as a mobile phone and/or computer. The smart-home GUI 906 may be utilized to receive the input data and/or to display recommendations and/or requests to a user. For example, the smart-home GUI 906 may be utilized to display a request to confirm that a selected accessory device is the desired device to be acted upon.

Figure 10:
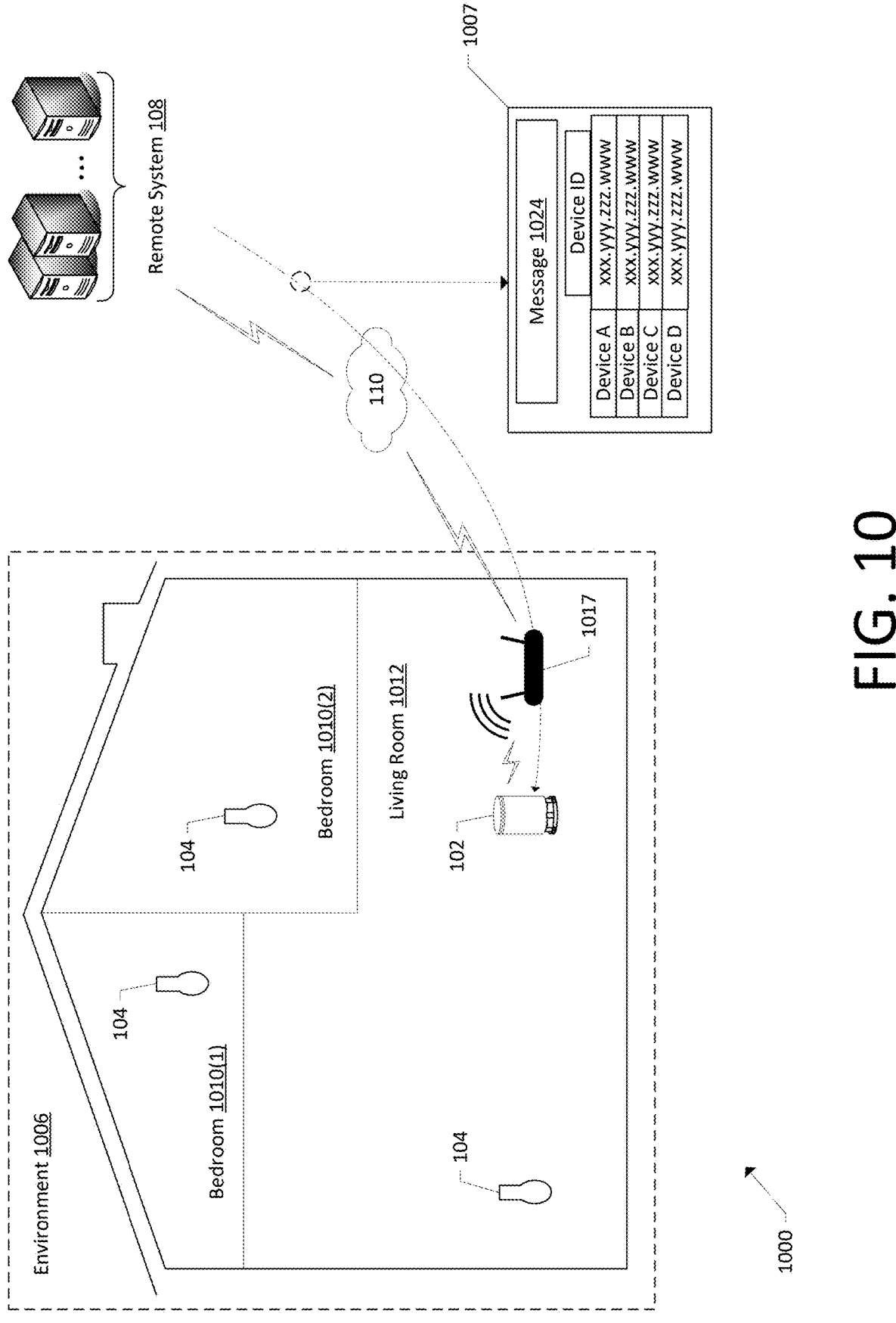
FIG. 10 illustrates a schematic diagram of an example environment for device discovery utilizing securely-exchanged information.

FIG. 10 illustrates a schematic diagram of an example environment for device discovery utilizing securely-exchanged information. FIG. 10 illustrates a discovery process that is performed when an accessory device 104 is first brought online (or in response to a significant change in device-related information, described below). The discovery process shown in FIG. 10 is configured to assist in the sharing of information between devices (e.g., communication between the devices) that are registered to a user. For example, when an audio playback device 104 first boots and comes online, the device 104 can send a device identifier 1007 to a remote system 108. The device identifier can include, without limitation, an Internet Protocol (IP) address of the device 104, a media access control (MAC) address, or any other suitable device identifier identifying the device 104. Any suitable networking protocol can be utilized for transmitting information from the device 104 to the remote system 108. At least one reason for utilizing the remote system 108 for assistance in discovery of devices 104 in the environment 1006 is due to the various possible network configurations that sometimes do not allow devices 104 in the environment 1006 to "see" one another via the LAN (e.g., multiple wireless access points (WAPs) 1017 may block discovery message packets between two devices 104 in the environment 1006, discovery packets may not transcend sub-nets within the LAN, etc.).

The device identifier 1007 received by the remote system 108 can be retained in storage of the remote system 108 for use by all of the devices 104 in the environment 1006 that are registered to a user. The device identifiers 1007 maintained in the remote system's 108 storage can also be used by a client-side application executable on a user's computing device, which may provide the user with information about which devices 104 are currently online at any given point in time.

The remote system 108 can send messages (e.g., serialized notify_change( ) messages) to the devices 104 in the environment 1006, so that devices 104 can update their individual connectivity information maintained in local storage of the device 104. For example, a message 1024 received by the device 104(3) (or "device C") from the remote system 108 may include the device identifiers 1007

(e.g., the IP addresses) of the other devices in the environment 1006 so that the device 104 is made aware of the other devices and knows how to communicate with them using the device identifiers 1007 (e.g., IP addresses). In some embodiments, the remote system 108 may query devices 104 registered to a user for current device identifier 1007 information. Alternatively, the remote system 108 may access a user registry maintained in the remote system's 108 storage in association with a particular user, the user registry including the devices 104 (e.g., the devices 104 of FIG. 10) registered to a user. In this manner, the remote system 108 maintains a mapping from registered devices 104 to the user.

In response to receipt, at a device 104, of the message 1024 from the remote system 108 that includes the device identifiers 1007 of the other online devices 104 in the environment 1006, the device 104 can share additional discovery information about the device 104 with the remaining devices 104 in the environment 1006, via the LAN in the environment 1006 and/or via the remote system 108. The additional discovery information shared amongst the devices 104 in the environment 1006 may include, without limitation, a signal strength value as measured between a device 104 and a local WAP 1017 (e.g., Received Signal Strength Indication (RSSI) value), a device type, a service set identifier (SSID) of the WAP 1017, a basic SSID (BSSID) of the WAP 1017, security keys (e.g., for private transmission of data between devices 104 via the LAN in the environment 1006), and so on. Some or all of this additional discovery information can be used to select one or more master devices for time synchronization (time master) and/or audio distribution (audio distribution master) purposes. Anytime there is a significant change to the device identifier 1007 and/or the additional discovery information from the device-side, an update message can be sent to the remote system 108, and the remote system 108 may update the devices 104 in the environment 1006 (including the device 104 that initiated the change). For example, if the IP address of the device 104 changes, the device 104 can send an update message to the remote system 108. As another example, if the difference between an initial signal strength measurement (signal strength value) between the device 104 and the WAP 1017 and a subsequent signal strength measurement (signal strength value) between the device 104 and the WAP 1017 is greater than a predefined signal strength difference threshold, an update message can be sent by the device 104 to the remote system 108. This may occur when a user relocates a device 104 within the environment 1006. After discovery, devices 104 in the environment 1006 are aware of the other devices 104 in the environment 1006, and know how to contact and communicate with the other devices 104 in the environment 1006.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A method comprising:

receiving first data requesting that an application associated with an accessory device associated with a first remote system be associated with account data stored in association with a user registry of a second remote system, wherein the application associated with the accessory device associated with the first remote system is configured to enable the accessory device associated with the first remote system for use in association with another device that is associated with the account data stored in association with the user registry of the second remote system;

determining that the application associated with the accessory device associated with the first remote system is not enabled for use in association with the account data stored in association with the user registry of the second remote system when the first data is received based at least in part on a token associated with the first data;

sending, to a personal device associated with the account data stored in association with the user registry of the second remote system and based at least in part on the application being not enabled for use in association with the account data stored in association with the user registry of the second remote system when the first data is received, a command configured to cause display of an option to select the application to be enabled with respect to the account data stored in association with the user registry of the second remote system;

receiving, from the personal device, second data indicating selection of the option; and causing, based at least in part on receiving the second data, the application to be enabled for use in association with the account data stored in association with the user registry of the second remote system.

2. The method of claim 1, wherein the another device is a voice-enabled device, and wherein the application associated with the accessory device is configured to enable the another device to cause the accessory device to perform an action in response to audio data representing an utterance.

3. The method of claim 1, further comprising:

sending, based at least in part on causing the application to be enabled for use in association with the account data, identifying information about the accessory device to the first remote system; and receiving, from the first remote system, authentication data enabling use of third data representing a command received from the first remote system.

4. The method of claim 1, wherein the first data is received during a setup process associated with the accessory device via a user interface configured to display, on the personal device, available applications for enablement with the account data.

5. The method of claim 1, further comprising:

determining that authentication credentials have been entered to access the application on the personal device; and based at least in part on the authentication credentials being entered, determining to refrain from requesting the authentication credentials to access functionality associated with the application.

6. The method of claim 1, wherein the application comprises a first application, and the method further comprises:

determining a second application associated with the first application;

causing display of an indicator of the second application based at least in part on the second application being associated with the first application;

receiving third data requesting the second application be enabled for the account data; and causing the second application to be enabled for to the account data.

7. The method of claim 1, further comprising:

receiving, from the first remote system and based at least in part on the application being enabled for use in association with the account data, identifying information associated with the accessory device, the identifying information including at least a naming indicator of the accessory device; and storing the identifying information in association with the account data.

8. A system comprising:

one or more processors; and non-transitory computer-readable media storing instructions that, when executed by the one or more processors, causes the one or more processors to perform operations comprising:

receiving first data requesting that an application associated with an accessory device associated with a first remote system be associated with account data stored in association with a user registry of a second remote system, wherein the application associated with the accessory device associated with the first remote system is configured to enable the accessory device associated with the first remote system for use in association with another device that is associated with the account data stored in association with the user registry of the second remote system;

determining that the application associated with the accessory device associated with the first remote system is not enabled for use in association with the account data stored in association with the user registry of the second remote system when the first data is received based at least in part on a token associated with the first data;

sending, to a personal device associated with the account data stored in association with the user registry of the second remote system and based at least in part on the application being not enabled for use in association with the account data stored in association with the user registry of the second remote system when the first data is received, a command configured to cause a voice interface device to display an option to select the application to be enabled with respect to the account data stored in association with the user registry of the second remote system;

receiving, from the personal device, second data indicating selection of the option; and causing, based at least in part on receiving the second data, the application to be enabled for use in association with the account data stored in association with the user registry of the second remote system.

9. The system of claim 8, wherein the another device is a voice-enabled device, and wherein the application associated with the accessory device is configured to enable the another device to cause the accessory device to perform an action in response to audio data representing an utterance.

10. The system of claim 8, the operations further comprising:

sending, based at least in part on causing the application to be enabled with respect to the account data, identifying information about at least one of the accessory device or the voice interface device to a device associated with the application; and receiving, from the device associated with the application, authentication data enabling use of commands by the voice interface device and the accessory device.

11. The system of claim 8, wherein the first data is received during a setup process associated with the accessory device via a user interface configured to display, on the personal device, available applications for enablement with the account data, the available applications including the application.

12. The system of claim 8, the operations further comprising:

determining that authentication credentials have been entered to access the application on the personal device; and based at least in part on the authentication credentials being entered, determining to refrain from requesting the authentication credentials to access functionality associated with the application.

13. The system of claim 8, wherein the application comprises a first application, and the operations further comprise:

determining a second application associated with the first application;

causing display of an indicator of the second application based at least in part on the second application being associated with the first application;

receiving third data requesting enablement of the second application with respect to the account data; and causing the second application to be enabled with respect to the account data.

14. The system of claim 8, the operations further comprising:

receiving, from a device associated with the application and based at least in part on the application being enabled with respect to the account data, identifying information associated with the accessory device, the identifying information including at least a naming indicator of the accessory device; and storing the identifying information in association with the account data.

15. A method comprising:

receiving first data requesting that an application associated with an accessory device associated with a first remote system be associated with account data stored in association with a user registry of a second remote system, wherein the application associated with the accessory device associated with the first remote system is configured to enable the accessory device associated with the first remote system for use in association with another device that is associated with the account data stored in association with the user registry of the second remote system;

determining that the application associated with the accessory device associated with the first remote system is not enabled for use in association with the account data stored in association with the user registry of the second remote system when the first data is received based at least in part on a token associated with the first data;

sending, to a personal device associated with the account data stored in association with the user registry of the second remote system and based at least in part on the application being not enabled for use in association with the account data stored in association with the user registry of the second remote system when the first data is received, a command configured to cause the personal device to display an option to select the application to be enabled for use in association with the account data stored in association with the user registry of the second remote system;

receiving, from the personal device, second data indicating selection of the option; and causing, based at least in part on receiving the second data, the application to be enabled for use in association with the account data stored in association with the user registry of the second remote system.

16. The method of claim 15, wherein the another device is a voice-enabled device, and wherein the application associated with the accessory device is configured to enable the another device to cause the accessory device to perform an action in response to audio data representing an utterance.

17. The method of claim 15, further comprising:

sending, based at least in part on causing the application to be enabled for use in association with the account data, identifying information about devices associated with the personal device to the first remote system; and receiving, from the first remote system, authentication data enabling use by the devices of third data representing a command received from the first remote system.

18. The method of claim 15, further comprising:

determining that authentication credentials have been entered to access the application on the personal device; and based at least in part on the authentication credentials being entered, determining to refrain from requesting the authentication credentials to access functionality associated with the application.

19. The method of claim 15, wherein the application comprises a first application, and the method further comprises:

determining a second application associated with the first application;

causing display of an indicator of the second application based at least in part on the second application being associated with the first application;

receiving third data requesting enablement of the second application for use in association with the account data; and causing the second application to be enabled for use in association with the account data.

20. The method of claim 15, further comprising:

receiving, from the first remote system and based at least in part on the application being enabled for use in association with the account data, identifying information about at least one device associated with the application and the personal device; and storing the identifying information in association with the account data.

* * * * *